United States Patent
Qu et al.

(10) Patent No.: US 12,457,506 B2
(45) Date of Patent: Oct. 28, 2025

(54) DATA TRANSMISSION METHOD AND APPARATUS

(71) Applicant: HUAWEI TECHNOLOGIES CO., LTD., Shenzhen (CN)

(72) Inventors: Kaiyang Qu, Hangzhou (CN); Qufang Huang, Shenzhen (CN); Xingxing Hu, Shanghai (CN); Chong Lou, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 386 days.

(21) Appl. No.: 17/964,587

(22) Filed: Oct. 12, 2022

(65) Prior Publication Data

US 2023/0040079 A1 Feb. 9, 2023

Related U.S. Application Data

(63) Continuation of application No. PCT/CN2020/084742, filed on Apr. 14, 2020.

(51) Int. Cl.
*H04W 24/02* (2009.01)
*H04W 24/10* (2009.01)

(52) U.S. Cl.
CPC .......... *H04W 24/02* (2013.01); *H04W 24/10* (2013.01)

(58) Field of Classification Search
CPC ..... H04W 24/02; H04W 24/10; H04W 24/08; H04W 76/20
See application file for complete search history.

(56) References Cited

U.S. PATENT DOCUMENTS

2014/0220963 A1* 8/2014 Jung .................. H04W 24/10
455/422.1
2019/0394783 A1 12/2019 Byun et al.
(Continued)

FOREIGN PATENT DOCUMENTS

CN 110786039 A 2/2020
CN 112954711 A 6/2021
(Continued)

OTHER PUBLICATIONS

ETSI TS 137 320 V10.1.0 (Apr. 2011); "Radio measurement collection for Minimization of Drive Tests (MDT)", ETSI, pp. 1-15. (Year: 2011).*
(Continued)

*Primary Examiner* — Robert C Scheibel
(74) *Attorney, Agent, or Firm* — Leydig, Voit & Mayer, Ltd.

(57) ABSTRACT

A terminal device generates a report result including at least one of a logged minimization of drive tests report, an RLF report, and an RACH report. The logged minimization of drive tests report includes an identifier of a candidate access cell, information indicating whether the candidate access cell supports a network slice service initiated by the terminal device, location information of the terminal device where the terminal device receives a system message of the candidate access cell, and a network slice identifier of the network slice service initiated by the terminal device. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice (Continued)

identifier. The terminal device sends the report result to a radio access network device to which a serving cell belongs.

15 Claims, 12 Drawing Sheets

(56) References Cited

U.S. PATENT DOCUMENTS

| | | | |
|---|---|---|---|
| 2020/0413290 A1* | 12/2020 | Yang | H04L 47/83 |
| 2021/0235300 A1* | 7/2021 | Teyeb | H04W 24/10 |
| 2022/0167196 A1* | 5/2022 | Arshad | H04W 24/10 |
| 2022/0167434 A1* | 5/2022 | Lin | H04W 74/0841 |
| 2022/0272587 A1* | 8/2022 | Arshad | H04W 36/0058 |
| 2023/0007686 A1* | 1/2023 | Belleschi | H04W 74/0833 |
| 2023/0029004 A1* | 1/2023 | Gao | H04W 48/12 |
| 2023/0117513 A1* | 4/2023 | Kim | H04W 48/16 455/423 |
| 2023/0354059 A1* | 11/2023 | Hong | H04W 24/10 |

FOREIGN PATENT DOCUMENTS

| | | |
|---|---|---|
| EP | 3589064 A1 | 1/2020 |
| WO | 2018134483 A1 | 7/2018 |
| WO | 2020025121 A1 | 2/2020 |

OTHER PUBLICATIONS

Samsung, "Addition of SON features", 3GPP TSG-RAN WG3 #107-e, E-Meeting, R3-201479, Total 139 pages, 3rd Generation Partnership Project, Valbonne, France, (Feb. 24-Mar. 6, 2020).

CN/202080097402.1, Office Action and Search Report, Jan. 17, 2025.

* cited by examiner

DATA TRANSMISSION METHOD AND APPARATUS

CROSS-REFERENCE TO RELATED APPLICATIONS

This application is a continuation of International Application No. PCT/CN2020/084742, filed on Apr. 14, 2020, the disclosure of which is hereby incorporated by reference in its entirety.

TECHNICAL FIELD

This application relates to the field of communication technologies, and in particular, to a data transmission method and an apparatus.

BACKGROUND

With the development of mobile communication technologies, various new services and application scenarios are emerging. 5th generation (5G) communication has flexibility and scalability, and further needs to meet different service requirements. Therefore, 5G uses end-to-end network slicing (slice) to provide services for users. Network slicing is a customized network service provided by operators for users. A plurality of isolated logical resources having different characteristics are virtualized on a same set of physical infrastructure through flexible allocation of network resources and on-demand networking, and each logical resource is a network slice. Each network slice may include a radio access network, a transport network, and a core subnet slice.

A random access process is a process that needs to be executed when user equipment (UE) accesses a network. In a conventional technology, after the UE completes random access and enters a connected mode, the UE sends a report result to a base station, where the report result includes a logged minimization of drive tests (Logged MDT) report, a random access channel (, RACH) report, and a radio link failure (RLF) report. The logged minimization of drive tests report includes a cell identifier, a timestamp, Bluetooth measurement information, radio measurement information, and the like. The random access report includes the cell identifier, a channel state information-reference signal (CSI-RS), reference signal received power (RSRP) quality, a random access event type, and the like. The RLF report mainly includes a connection failure type, a failed cell ID, and a radio link failure cause. The base station may optimize a related configuration of a cell based on the received report result.

In the foregoing process, the report result sent by the UE to the base station is a related measurement result of the UE in one or more cells. One cell may support a plurality of network slices, different network slices support different services, and different network slices may be deployed in different cells. In this case, how the UE reports the report result more effectively is an urgent problem to be resolved.

SUMMARY

This application provides a data transmission method and an apparatus, to resolve a problem of how a terminal device reports a report result more effectively in a scenario in which different network slices support different services.

A terminal device generates a report result, where the report result includes at least one of a logged minimization of drive tests report, a radio link failure (RLF) report, and a random access channel (RACH) report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device.

According to the data transmission method provided in the first aspect, the terminal device generates the report result, and sends the report result to a radio access network device to which a serving cell belongs. The report result includes at least one of the minimization of drive tests report, the RLF report, and the RACH report. All the minimization of drive tests report, the RLF report, and the RACH report carry information related to the network slice service. The radio access network device may learn, based on the logged minimization of drive tests report, of whether each candidate access cell supports the network slice service initiated by the terminal device and the network slice identifier corresponding to the network slice service initiated by the terminal device in a corresponding candidate access cell. The radio access network device may learn, based on the RLF report, of the network slice identifier corresponding to the network slice service initiated by the terminal device in the cell that is already accessed by the terminal device and in which the radio link failure occurs. The radio access network device may learn, based on the RACH report, of the network slice identifier corresponding to the network slice service initiated by the terminal device in the already accessed cell. Therefore, the radio access network device may adjust a network slice supported by the radio access network device when determining, based on related network slice information learned of from at least one of the three reports, that the network slice supported by the radio access network device needs to be adjusted. Therefore, a problem of how the terminal device reports the report result in a scenario in which different network slices support different services is resolved. Further, the radio access network device may adjust the network slice supported by the radio access network device when determining, based on the report result reported by the terminal device, that the network slice supported by the radio access network device needs to be adjusted, to improve a success rate of accessing the network slice by the terminal device.

In an embodiment, the method in this embodiment may further include:

The terminal device receives updated network slice configuration information sent by the radio access network device, where the updated network slice configuration information is determined by the radio access network device, a network management device, or an access and mobility management function (AMF) network element based on the report result of at least one terminal device within a preset time period. The updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

According to the data transmission method provided in this embodiment, a network slice identifier list includes a network slice identifier corresponding to a network slice service initiated by a terminal device in a cell controlled by a radio access network device, so that a network slice identifier list corresponding to a network slice supported by the radio access network device after adjustment includes the network slice identifier corresponding to the network slice service initiated by the terminal device, to improve a success rate of accessing a network slice by the terminal device.

In an embodiment, that a terminal device generates a report result may be specifically:

The terminal device performs the following operations based on reference signal information of the already measured candidate access cell:

The terminal device obtains a network slice identifier list of a first candidate access cell;

the terminal device determines, based on the network slice identifier list of the first candidate access cell, whether the first candidate access cell supports the network slice service initiated by the terminal device; and if yes is determined, after determining that random access to the first candidate access cell succeeds, the terminal device stores an RACH report corresponding to the first candidate access cell; or after determining that random access to the first candidate access cell succeeds and the radio link failure occurs in a subsequent communication process, the terminal device stores an RLF report corresponding to the first candidate access cell; or after determining that random access to the first candidate access cell fails, the terminal device obtains a network slice identifier list of a second candidate access cell, and stores a logged minimization of drive tests report corresponding to the first candidate access cell; or if no is determined, the terminal device stores the logged minimization of drive tests report corresponding to the first candidate access cell, or the terminal device obtains the network slice identifier list of the second candidate access cell, and stores the logged minimization of drive tests report corresponding to the first candidate access cell.

According to the data transmission method provided in this embodiment, in a process in which a terminal device generates a report result, a minimization of drive tests report, an RLF report, and an RACH report all carry information related to a network slice service, so that a radio access network device can adjust, based on the information that is related to the network slice service and that is carried in the report result that is sent by a plurality of terminal devices and that is received within a preset time period, a network slice supported by the radio access network device, to improve a success rate of accessing a network slice by the terminal device.

In an embodiment, the method in this embodiment may further include:

When the terminal device determines that one or more already stored RACH reports satisfy a preset condition, the terminal device deletes the one or more already stored RACH reports in ascending order of importance. The preset condition may be that a quantity of carried RACH reports is greater than or equal to a preset threshold, or duration of carrying the RACH report is greater than or equal to a preset threshold. For example, if the quantity of the carried RACH reports is greater than eight, the duration of carrying the RACH report is greater than 48 hours, or both are satisfied, it is determined that the preset condition is satisfied. A condition for determining importance of the RACH report may be: Importance of an RACH report of a cell that supports the network slice service initiated by the terminal device is higher than importance of an RACH report of a cell that does not support the network slice service initiated by the terminal device. Alternatively, importance of an RACH report of a cell having good signal quality (or high signal strength) is higher than importance of an RACH report of a cell having bad signal quality (or low signal strength). Compared with random deletion in a conventional technology, the method that the one or more already stored RACH reports are deleted in ascending order of importance can prolong storage time of an RACH report of high importance, to fully utilize the RACH report.

In an embodiment, there are the following two cases in which that the terminal device determines that random access to the first candidate access cell fails:

The terminal device determines that a quantity of random access attempts initiated in the first candidate access cell is greater than a first threshold; or the terminal device determines that random access to the first candidate access cell succeeds and that a quantity of random access attempts initiated again after the radio link failure occurs in the subsequent communication process is greater than a first threshold.

In an embodiment, the logged minimization of drive tests report further includes at least one of network slice remapping information of the candidate access cell and network slice redirection of the candidate access cell.

According to the data transmission method provided in this embodiment, a logged minimization of drive tests report carries network slice remapping information of a candidate access cell, and a radio access network device that receives a report result sent by a terminal device may adjust new network slice remapping information based on the network slice remapping information (namely, the network slice remapping information that is of the candidate access cell and that is included in the logged minimization of drive tests report) originally stored by the terminal device, so that the terminal device successfully initiates a network slice service. The logged minimization of drive tests report carries the network slice redirection information of the candidate access cell, and the radio access network device that receives the report result sent by the terminal device may redirect the terminal device to a cell that supports the network slice service, to initiate a corresponding network slice service.

In an embodiment, the method in this embodiment may further include:

The terminal device receives adjustment information of an access category sent by the radio access network device, where the adjustment information of the access category is used to add the access category related to the network slice service; or the terminal device prestores adjustment information of an access category.

According to the data transmission method provided in this embodiment, a terminal device receives adjustment information of an access category sent by a radio access network device; or the terminal device prestores adjustment information of an access category. The adjustment information of the access category is used to add an access category related to a network slice service, so that a probability of accessing a network slice by the terminal device can be increased, and a probability of accessing a non-network slice service by the terminal device can be reduced.

In an embodiment, when the report result includes the RACH report, before that the terminal device sends the report result to a radio access network device to which a serving cell belongs, the method further includes: The terminal device determines that a quantity of RACH reports already stored by the terminal device is greater than or equal to a preset quantity and/or time for which the RACH report has been stored by the terminal device is greater than or equal to preset duration. The quantity of the already stored RACH reports may be obtained by using a counter set by the terminal device, and the time for which the RACH report has been stored may be obtained by using a timer set by the terminal device.

According to the data transmission method provided in this embodiment, after a terminal device generates an RACH report, the terminal device determines that a quantity of RACH reports already stored by the terminal device is greater than or equal to a preset quantity and/or time for which the RACH report has been stored by the terminal device is greater than or equal to preset duration, the terminal device sends the RACH report to a radio access network device to which a serving cell belongs, so that the radio access network device does not need to send an RACH report request, and the terminal device actively reports the RACH report.

In an embodiment, after that the terminal device sends the report result to a radio access network device to which a serving cell belongs, the method further includes:

The terminal device deletes the one or more already stored RACH reports in ascending order of importance. A condition for determining importance may be as follows: Importance of an RACH report of a cell that supports the network slice service initiated by the terminal device is higher than importance of an RACH report of a cell that does not support the network slice service initiated by the terminal device; or importance of an RACH report of a cell having good signal quality (or high signal strength) is higher than importance of an RACH report of a cell having poor signal quality (or low signal strength). The terminal device may delete one or more reports, or clear an entire memory that stores the RACH report. The one or more already stored RACH reports are deleted in ascending order of importance, so that storage time of an RACH report of high importance can be prolonged, to fully utilize the RACH report.

According to a second aspect, this application provides a data transmission method, including:

A radio access network device establishes a connection to a terminal device; and the radio access network device receives a report result sent by the terminal device, where the report result includes at least one of a logged minimization of drive tests report, a radio link failure RLF report, and a random access channel RACH report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device.

According to the data transmission method provided in the second aspect, the radio access network device receives the report result sent by the terminal device after establishing the connection to the terminal device. The report result includes at least one of the minimization of drive tests report, the RLF report, and the RACH report. All the minimization of drive tests report, the RLF report, and the RACH report carry information related to the network slice service. The radio access network device may learn, based on the logged minimization of drive tests report, of whether each candidate access cell supports the network slice service initiated by the terminal device and the network slice identifier corresponding to the network slice service initiated by the terminal device in a corresponding candidate access cell. The radio access network device may learn, based on the RLF report, of the network slice identifier corresponding to the network slice service initiated by the terminal device in the cell that is already accessed by the terminal device and in which the radio link failure occurs. The radio access network device may learn, based on the RACH report, of the network slice identifier corresponding to the network slice service initiated by the terminal device in the already accessed cell. Therefore, the radio access network device may adjust a network slice supported by the radio access network device when determining, based on related network slice information learned of from at least one of the three reports, that the network slice supported by the radio access network device needs to be adjusted. Therefore, a problem of how the terminal device reports the report result in a scenario in which different network slices support different services is resolved. Further, the radio access network device may adjust the network slice supported by the radio access network device when determining, based on the report result reported by the terminal device, that the network slice supported by the radio access network device needs to be adjusted, to improve a success rate of accessing the network slice by the terminal device.

In an embodiment, the method in this embodiment may further include:

The radio access network device sends updated network slice configuration information to the terminal device, where the updated network slice configuration information is determined by the radio access network device, a network management device, or an access and mobility management function AMF network element based on the report result of at least one terminal device within a preset time period. The updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

According to the data transmission method provided in this embodiment, a network slice identifier list includes a network slice identifier corresponding to a network slice service initiated by a terminal device in a cell controlled by a radio access network device, so that a network slice identifier list corresponding to a network slice supported by the radio access network device after adjustment includes the network slice identifier corresponding to the network slice service initiated by the terminal device, to improve a success rate of accessing a network slice by the terminal device.

In an embodiment, the method in this embodiment may further include:

The radio access network device stores the report result, and sends the report result to another radio access network device.

According to the data transmission method provided in this embodiment, a radio access network device sends a report result to another radio access network device, and the radio access network device may adjust, based on the information that is related to a network slice service and that is carried in the report result that is sent by a plurality of terminal devices and that is received within a preset time period, a network slice supported by the radio access network device.

In an embodiment, the method in this embodiment may further include:

The radio access network device determines the network slice identifier list based on a logged minimization of drive tests report, an RLF report, and an RACH report in the report result that is of a plurality of terminal devices and that is received within a preset time period.

In an embodiment, the method in this embodiment may further include:

The radio access network device stores the report result, and sends the report result to the network management device or the AMF, so that the network management device or the AMF determines, based on the logged minimization of drive tests report, the RLF report, and the RACH report in the report result that is of the plurality of terminal devices and that is received within the preset time period, a radio access network device that needs to adjust a network slice service and a corresponding network slice identifier list.

According to the data transmission method provided in this embodiment, a radio access network device sends a report result to a network management device or an AMF, and the network management device or the AMF determines, based on a logged minimization of drive tests report, an RLF report, and an RACH report in a report result that is of a plurality of terminal devices and that is received within a preset time period, a radio access network device that needs to adjust a network slice service and a corresponding network slice identifier list. Compared with the method that the radio access network device determines whether to adjust a network slice supported by the radio access network device and how to adjust the network slice supported by the radio access network device, in this embodiment, the network management device or the AMF determines which radio access network device needs to adjust the network slice service and how to adjust the network slice service, and accuracy is higher. Because the network management device or the AMF may obtain report results of respective terminal devices of a plurality of radio access network devices, centralized decision-making may be performed, to improve overall network experience in an area.

In an embodiment, before that the radio access network device sends updated network slice configuration information to the terminal device, the method may further include:

The radio access network device receives an adjustment instruction sent by the network management device or the AMF, where the adjustment instruction includes the updated network slice identifier list corresponding to the radio access network device.

According to the data transmission method provided in this embodiment, a network management device or an AMF determines a radio access network device that needs to adjust a network slice service and a corresponding network slice identifier list, and then sends an adjustment instruction to the radio access network device that needs to adjust the network slice service. Compared with the method that the radio access network device determines whether to adjust a network slice by the radio access network device and how to adjust the network slice supported, in this embodiment, the network management device or the AMF determines which radio access network device needs to adjust a network slice service and how to adjust the network slice service, and accuracy is higher. Because the network management device or the AMF can obtain more report results of a terminal device, and a decision is more complete, to improve overall network experience in an area.

In an embodiment, the method in this embodiment may further include:

The radio access network device determines updated network slice remapping information based on the report result and the updated network slice configuration information, and the radio access network device sends the updated network slice remapping information to the terminal device.

According to the data transmission method provided in this embodiment, a radio access network device adjusts network slice remapping information based on a report result and updated network slice configuration information, so that a terminal device can successfully initiate a network slice service, to increase a probability of accessing a network slice by the terminal device.

In an embodiment, the updated network slice configuration information further includes adjustment information of access control information of the network slice service. The adjustment information of the access control information of the network slice service is carried, so that a probability that the terminal device accesses a non-network slice service can be reduced, and the terminal device preferentially accesses a network slice service.

In an embodiment, the adjustment information of the access control information of the network slice service is a system message. The radio access network device updates an access control parameter set list information element in an SIB 1. Specifically, there are the following four optional manners:

An access control identifier ID related to the network slice service is deleted from unified access control-barring for access identity information in the system message;
    an access control ID unrelated to the network slice service is added to unified access control-barring for access identity information in the system message;
    a value of a unified access control-barring for factor information element that is in the system message and that corresponds to the network slice service decreases within a preset range; or a value of a unified access control time information element that is in the system message and that corresponds to the network slice service increases within a preset range.

In an embodiment, the method in this embodiment may further include:

The radio access network device sends adjustment information of an access category to the terminal device, where the adjustment information of the access category is used to add the access category related to the network slice service; or the radio access network device prestores adjustment information of an access category.

According to the data transmission method provided in this embodiment, a radio access network device sends adjustment information of an access category to a terminal device; or the radio access network device prestores adjustment information of an access category. The adjustment information of the access category is used to add the access category related to a network slice service, so that a probability of accessing a network slice by the terminal device can be increased, and a probability of accessing a non-network slice service by the terminal device can be reduced.

In an embodiment, the method in this embodiment may further include:

The radio access network device modifies a current configuration, where the configuration includes at least one of a data radio bearer, a spectrum bandwidth configuration, a carrier configuration, and a modulation and demodulation scheme configuration that are supported by the radio access network device.

According to a third aspect, this application provides a terminal device, including:

a generation module, configured to generate a report result, where the report result includes at least one of a logged minimization of drive tests report, a radio link failure RLF report, and a random access channel RACH report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device; and a sending module, configured to send the report result to a radio access network device to which a serving cell belongs.

In an embodiment, the terminal device may further include:

a receiving module, configured to receive updated network slice configuration information sent by the radio access network device, where the updated network slice configuration information is determined by the radio access network device, a network management device, or an access and mobility management function AMF network element based on the report result of at least one terminal device within a preset time period, where the updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

In an embodiment, the generation module is configured to:

perform the following operations based on reference signal information of the already measured candidate access cell:

obtaining a network slice identifier list of a first candidate access cell;

determining, based on the network slice identifier list of the first candidate access cell, whether the first candidate access cell supports the network slice service initiated by the terminal device; and if yes is determined, after determining that random access to the first candidate access cell succeeds, storing an RACH report corresponding to the first candidate access cell; or after determining that random access to the first candidate access cell succeeds and the radio link failure occurs in a subsequent communication process, storing an RLF report corresponding to the first candidate access cell; or after determining that random access to the first candidate access cell fails, obtaining a network slice identifier list of a second candidate access cell, and storing a logged minimization of drive tests report corresponding to the first candidate access cell; or if no is determined, storing the logged minimization of drive tests report corresponding to the first candidate access cell, or obtaining the network slice identifier list of the second candidate access cell, and storing the logged minimization of drive tests report corresponding to the first candidate access cell.

In an embodiment, the terminal device may further include:

a first deletion module, configured to delete the one or more already stored RACH reports in ascending order of importance when it is determined that the one or more already stored RACH reports satisfy a preset condition.

In an embodiment, that the generation module determines that random access to the first candidate access cell fails includes:

determining that a quantity of times of random access to the first candidate access cell is greater than a first threshold; or determining that random access to the first candidate access cell succeeds and that a quantity of random access attempts initiated again after the radio link failure occurs in the subsequent communication process is greater than a first threshold.

In an embodiment, the logged minimization of drive tests report further includes at least one of network slice remapping information of the candidate access cell and network slice redirection of the candidate access cell.

In an embodiment, the receiving module is further configured to:
receive adjustment information of an access category sent by the radio access network device, where the adjustment information of the access category is used to add the access category related to the network slice service; or the terminal device further includes a storage module, where the storage module is configured to prestore adjustment information of an access category.

In an embodiment, when the report result includes the RACH report, the terminal device may further include:
a determining module, configured to, before the sending module sends the report result to the radio access network device to which the serving cell belongs, determine that a quantity of RACH reports already stored by the terminal device is greater than or equal to a preset quantity and/or time for which the RACH report has been stored by the terminal device is greater than or equal to preset duration.

In an embodiment, the terminal device may further include:
a second deletion module, configured to: after that the sending module sends the report result to a radio access network device to which a serving cell belongs, delete the one or more already stored RACH reports in ascending order of importance.

For beneficial effects of the terminal device provided in the third aspect and the possible designs of the third aspect, refer to the beneficial effects brought by the first aspect and the possible implementations of the first aspect. Details are not described herein again.

According to a fourth aspect, this application provides a radio access network device, including:
a processing module, configured to establish a connection to a terminal device; and
a receiving module, configured to receive a report result sent by the terminal device, where the report result includes at least one of a logged minimization of drive tests report, a radio link failure (RLF) report, and a random access channel (RACH) report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device.

In an embodiment, the radio access network device may further include:
a sending module, configured to send updated network slice configuration information to the terminal device, where the updated network slice configuration information is determined by the radio access network device, a network management device, or an access and mobility management function AMF network element based on the report result of at least one terminal device within a preset time period, where the updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

In an embodiment, the processing module is further configured to store the report result, and the sending module is further configured to send the report result to another radio access network device.

In an embodiment, the processing module is further configured to determine the network slice identifier list based on a logged minimization of drive tests report, an RLF report, and an RACH report in report result that is of a plurality of terminal devices and that is received within the preset time period.

In an embodiment, the processing module is further configured to store the report result; and the sending module is further configured to send the report result to the network management device or the access and mobility management function (AMF) network element, so that the network management device or the AMF determines, based on the logged minimization of drive tests report, the RLF report, and the RACH report in the report result that is of the plurality of terminal device and that is received within the preset time period, a radio access network device that needs to adjust a network slice service and a corresponding network slice identifier list.

In an embodiment, the receiving module is further configured to: before the sending module sends the updated network slice configuration information to the terminal device, receive an adjustment instruction sent by the network management device or the AMF, where the adjustment instruction includes the updated network slice identifier list corresponding to the radio access network device.

In an embodiment, the processing module is further configured to: determine updated network slice remapping information based on the report result and the updated network slice configuration information; and
the sending module is further configured to send the updated network slice remapping information to the terminal device.

In an embodiment, the updated network slice configuration information further includes adjustment information of access control information of the network slice service.

In an embodiment, the adjustment information of the access control information of the network slice service is a system message.

An access control identifier ID related to the network slice service is deleted from unified access control-barring for access identity information in the system message;
an access control ID unrelated to the network slice service is added to unified access control-barring for access identity information in the system message;
a value of a unified access control-barring for factor information element that is in the system message and that corresponds to the network slice service decreases within a preset range; or
a value of a unified access control time information element that is in the system message and that corresponds to the network slice service increases within a preset range.

In an embodiment, the sending module is further configured to:
send adjustment information of an access category to the terminal device, where the adjustment information of the access category is used to add the access category related to the network slice service; or the processing module is further configured to prestore adjustment information of an access category.

In an embodiment, the processing module is further configured to:

modify a current configuration, where the configuration includes at least one of a data radio bearer, a spectrum bandwidth configuration, a carrier configuration, and a modulation and demodulation scheme configuration that are supported by the radio access network device.

For beneficial effects of the radio access network device provided in the fourth aspect and the possible designs of the fourth aspect, refer to the beneficial effects brought by the second aspect and the possible implementations of the second aspect. Details are not described herein again.

According to a fifth aspect, this application provides a terminal device, including a memory and a processor, where the memory is configured to store program instructions; and the processor is configured to invoke the program instructions in the memory, to perform the data transmission method in any one of the first aspect and the possible designs of the first aspect.

According to a sixth aspect, this application provides a radio access network device, including a memory and a processor, where the memory is configured to store program instructions; and the processor is configured to invoke the program instructions in the memory, to perform the data transmission method in any one of the second aspect and the possible designs of the second aspect.

According to a seventh aspect, this application provides a computer-readable storage medium. The readable storage medium stores execution instructions. When at least one processor of a terminal device executes the execution instructions, the terminal device performs the data transmission method in any of the first aspect and the possible designs of the first aspect.

According to an eighth aspect, this application provides a computer-readable storage medium. The readable storage medium stores execution instructions. When at least one processor of a radio access network device executes the execution instructions, the radio access network device performs the data transmission method in any one of the second aspect or the possible designs of the second aspect.

DESCRIPTION OF EMBODIMENTS

Figure 1:
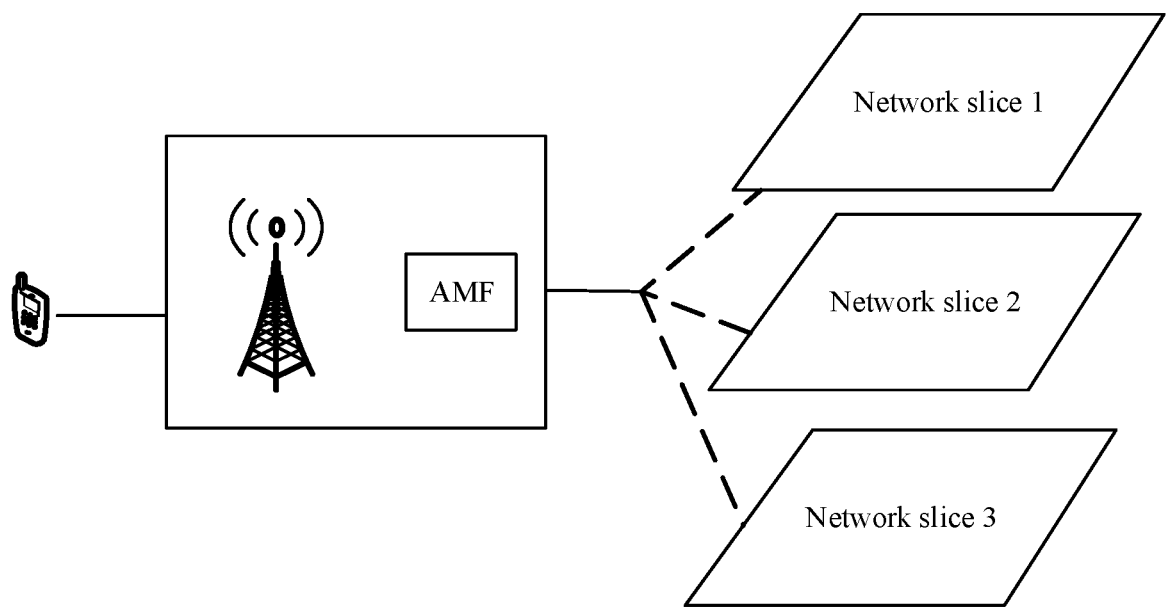
FIG. 1 is a schematic diagram of an architecture of a network slice service according to this application.

Embodiments of this application may be applied to a wireless communication system. It should be noted that the wireless communication system mentioned in embodiments of this application includes but is not limited to a narrowband internet of things (NB-IoT) system, a global system for mobile communications (, GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three application scenarios of a next-generation 5G mobile communications system: enhanced mobile broadband (eMBB), URLLC, and massive machine-type communications (mMTC).

A communication apparatus in this application mainly includes a radio access network device or a terminal device. In this application, if a transmit end is a radio access network device, a receive end is a terminal device; or if a transmit end is a terminal device, a receive end is a radio access network device.

The terminal device in embodiments of this application may be a wireless terminal. The wireless terminal may be a device that provides a voice and/or other service data connectivity for a user, a handheld device having a wireless connection function, or another processing device connected to a wireless modem. The wireless terminal may communicate with one or more core networks through a radio access network (RAN). The wireless terminal may be a mobile terminal, such as a mobile phone (which is also referred to as a "cellular" phone) and a computer having a mobile terminal, for example, may be a portable, pocket-sized, handheld, computer built-in, or in-vehicle mobile apparatus, which exchanges a voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a remote station, a remote terminal, an access terminal, a user terminal, a user agent, or user equipment (user device or user equipment). This is not limited thereto.

Embodiments are described with reference to a radio access network device in this application. The radio access network device may be a device configured to communicate with a terminal device, for example, may be a base transceiver station (BTS) in a GSM system or CDMA system, may be a NodeB (NB) in a WCDMA system, may be an evolved NodeB (evolutional NodeB, eNB or eNodeB) in an LTE system, or may be a next generation NodeB (ng-eNB) in an LTE system, or the radio access network device may be a relay station, an access point (AP), an vehicle-mounted device, a wearable device, a network side device in a 5G network, a radio access network device in a future evolved public land mobile network (PLMN), or the like, for example, may be a next generation NodeB (gNB or gNodeB).

This application may be applied to a network slice service scenario in a 5G communication system. A communication system in this application may include a radio access network device and a terminal device. FIG. 1 is a schematic diagram of an architecture of a network slice service according to this application. As shown in FIG. 1, the architecture of the network slice service mainly relates to a terminal device, a radio access network device, and a core network device (including an access and mobility management function (AMF) network element). FIG. 1 shows three network slices, one network slice may be deployed in different cells, and different network slices support different services. This application mainly relates to network slice selection in a process in which the terminal device accesses a core network by using a RAN in a scenario in which different network slices support different services. Specifically, the terminal device reports a report result related to network slice information to the radio access network device, and the radio access network device adjusts, based on the report result that is of the terminal device and that is received within a preset time period, a network slice service supported by the radio access network device, to improve a success rate of accessing the network slice by the terminal device.

It should be noted that this embodiment of this application is not limited to the foregoing architecture of the network slice service, and may be further applied to another future communication system, for example, a 6th generation (6G) communication system architecture. In addition, the foregoing network elements with names used in this embodiment of this application may maintain similar functions in the future communication system, but the names may change.

In a related technology, a report result sent by UE to a base station is a related measurement result of the UE in one or more cells. One cell may support a plurality of network slices, different network slices support different services, and different network slices may be deployed in different cells. In this case, how the UE reports the report result more effectively is an urgent problem to be resolved. To resolve this problem, this application provides a data transmission method and an apparatus. A terminal device sends a report result to a radio access network device to which a serving cell belongs, where the report result includes at least one of a logged minimization of drive tests report, an RLF report, and an RACH report. The logged minimization of drive tests report carries an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device. The RLF report carries an identifier of a cell in which a radio link failure occurs after the terminal device accesses the cell and the network slice identifier corresponding to the network slice service in which the radio link failure occurs on the terminal device. The RACH report carries an identifier of a cell accessed by the terminal device and the network slice identifier corresponding to the network slice service initiated by the terminal device. Because the report result carries information related to the network slice service, for the logged minimization of drive tests report, the radio access network device may learn of whether each candidate access cell supports the network slice service initiated by the terminal device and the network slice identifier corresponding to the network slice service initiated by the terminal device in the corresponding candidate access cell. For the RLF report, the radio access network device may learn of the network slice identifier corresponding to the network slice service initiated by the terminal device in the cell that the terminal device already accesses and in which the radio link failure occurs. For the RACH report, the radio access network device may learn of the network slice identifier corresponding to the network slice service initiated by the terminal device in the already accessed cell. Therefore, when the radio access network device determines, based on the information that is related to the network slice service and that is carried in the report result that is sent by a plurality of terminal devices and that is received within the preset time period, that the radio access network device needs to adjust a network slice supported by the radio access network device, to improve a success rate of accessing the network slice by the terminal device. Therefore, a problem of how the terminal device reports the report result is resolved, and the radio access network device may adjust, based on the report result reported by the terminal device, the network slice supported by the radio access network device.

A data transmission method and an apparatus provided in this application are described below with reference to the accompanying drawings.

Figure 2:
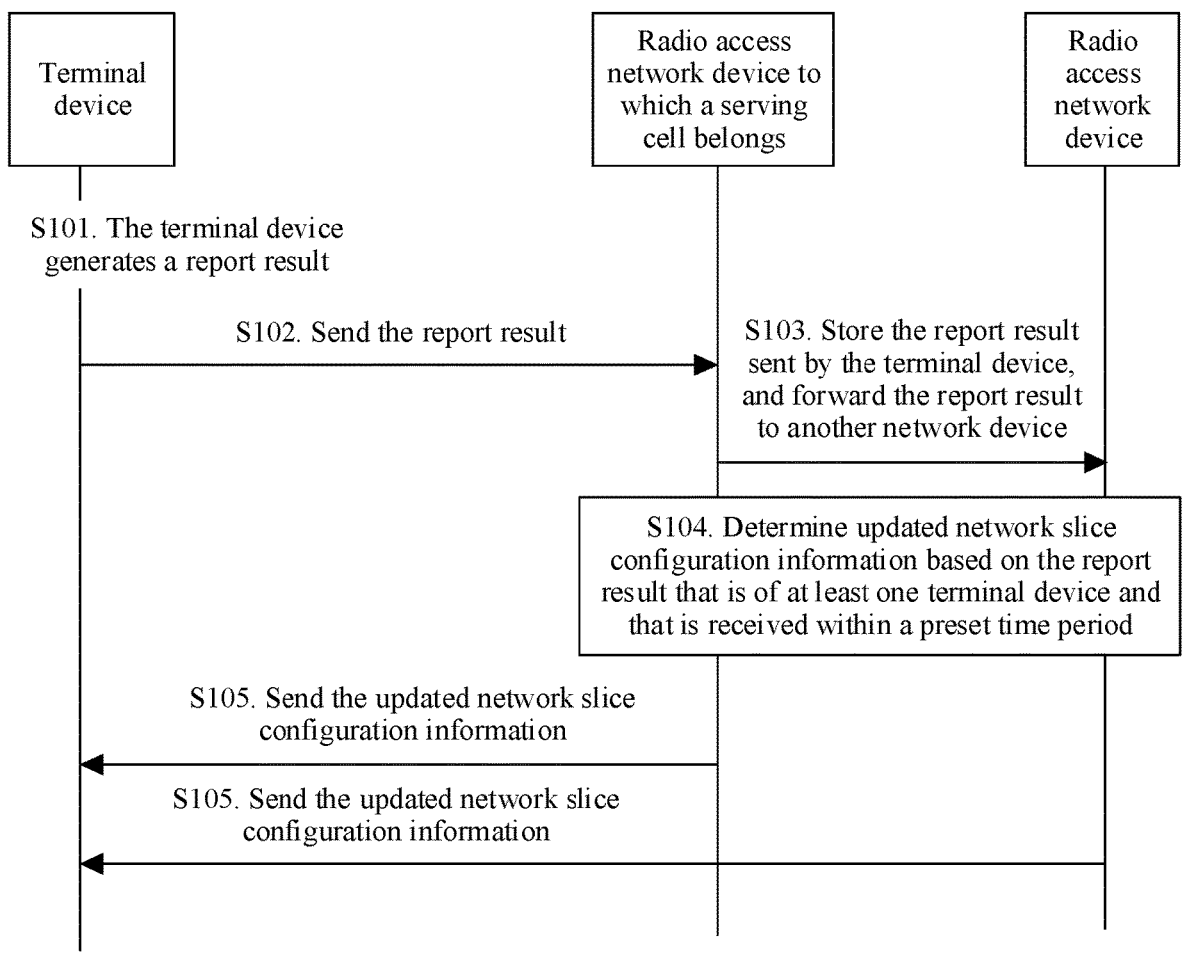
FIG. 2 is an interaction flowchart of an embodiment of a data transmission method according to this application.

FIG. 2 is an interaction flowchart of an embodiment of a data transmission method according to this application. As shown in FIG. 2, the method in this embodiment may include the following steps.

S101. A terminal device generates a report result.

For example, that the terminal device generates the report result may be specifically: The terminal device performs S1011 to S1014 based on reference signal information of a candidate access cell that is already measured, where the reference signal information of the candidate access cell may be reference signal received power (RSRP) or reference signal received quality (RSRQ). The candidate access cell is first N cells sorted in descending order of signal strength or signal quality in one or more cells measured by the terminal device, and N is a preset positive integer.

S1011. The terminal device obtains a network slice identifier list of a first candidate access cell.

Specifically, the network slice identifier list of the first candidate access cell may be obtained by reading network slice information in a system broadcast of the first candidate access cell. The network slice identifier list may include one or more network slice identifiers.

S1012. The terminal device determines, based on the network slice identifier list of the first candidate access cell, whether the first candidate access cell supports a network slice service initiated by the terminal device.

S1013. If yes is determined, the terminal device determines to store an RACH report corresponding to the first candidate access cell after random access to the first candidate access cell succeeds; or after determining that random access to the first candidate access cell succeeds and a radio link failure occurs in a subsequent communication process, the terminal device stores an RLF report corresponding to the first candidate access cell; or after determining that random access to the first candidate access cell fails, the terminal device obtains a network slice identifier list of a second candidate access cell, and stores a logged minimization of drive tests report corresponding to the first candidate access cell.

In an implementable manner, the terminal device determines, in the following two optional manners, that random access to the first candidate access cell fails:

Manner 1: The terminal device determines that a quantity of random access attempts initiated in the first candidate access cell is greater than a first threshold. In this case, the terminal device is in an idle mode.

Manner 2: The terminal device determines that random access to the first candidate access cell succeeds and that a quantity of random access attempts initiated again after the radio link failure occurs in the subsequent communication process is greater than a first threshold.

S1014. If no is determined, the terminal device stores the logged minimization of drive tests report corresponding to the first candidate access cell; or the terminal device obtains the network slice identifier list of the second candidate access cell, and stores the logged minimization of drive tests report corresponding to the first candidate access cell.

For example, if the terminal device determines that random access to the first candidate access cell fails or the terminal device determines that the first candidate access cell does not support the network slice service initiated by the terminal device, the terminal device stores the logged minimization of drive tests report corresponding to the first candidate access cell, and attempts to obtain the network slice identifier list of the second candidate access cell. If the network slice identifier list of the second candidate access cell can be obtained, the terminal device determines, based on the network slice identifier list of the second candidate access cell, whether the second candidate access cell supports the network slice service initiated by the terminal device. If yes is determined, the terminal device initiates random access in the second candidate access cell. The terminal device stores an RACH report corresponding to the second candidate access cell after determining that random access to the second candidate access cell succeeds, the terminal device stores an RLF report corresponding to the second candidate access cell after determining that random access to the second candidate access cell succeeds and the radio link failure occurs in a subsequent communication process, or after random access to the second candidate access cell fails, the terminal device continues to attempt to obtain a network slice identifier list of another candidate access cell until the terminal device successfully randomly accesses a cell. If the terminal device fails to obtain the network slice identifier list of the second candidate access cell, for example, the terminal device is in a central coverage area of the first candidate cell, the terminal device stores the logged minimization of drive tests report corresponding to the first candidate access cell.

Figure 3:
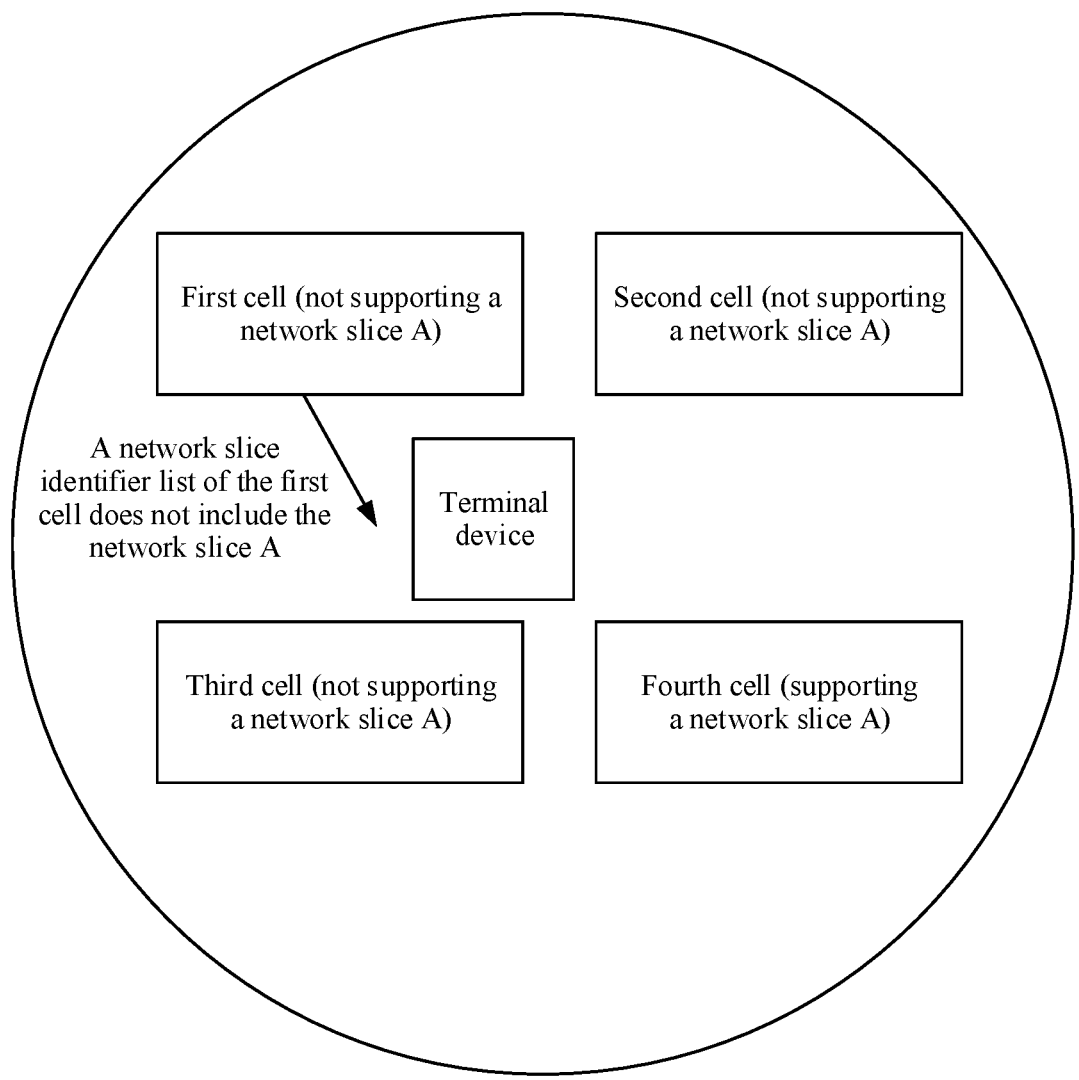
FIG. 3 is a schematic diagram of a scenario in which a terminal device stores a logged minimization of drive tests report.

FIG. 3 is a schematic diagram of a scenario in which a terminal device stores a logged minimization of drive tests report. As shown in FIG. 3, a first cell, a second cell, and a third cell in FIG. 3 are respectively top three candidate access cells having best signal strength (or signal quality) measured by the terminal device. None of the three cells supports the network slice service initiated by the terminal device, for example, a network slice A, and a fourth cell whose signal strength (or signal quality) ranks the fourth supports the network slice service initiated by the terminal device. The terminal device first chooses to camp on the first cell and implement downlink synchronization, and obtains a network slice identifier list of the first cell by listening to a system information broadcast of the first cell. The network slice identifier list of the first cell does not include the network slice A, and it is learned that the first cell does not support the network slice service initiated by the terminal device. Then, the terminal device records related network slice information in the logged minimization of drive tests report, then the terminal device chooses to camp on the second cell in descending order of signal strength (or in descending order of signal quality) to implement downlink synchronization, and a network slice identifier list of the second cell is obtained by listening to a system information broadcast of the second cell. The network slice identifier list of the second cell does not include the network slice A, and it is learned that the second cell does not support the network slice service initiated by the terminal device either. Then, the terminal device records related network slice information of the second cell in the logged minimization of drive tests report, that is, retains the related network slice information of the first cell, and also records the related network slice information of the second cell in the logged minimization of drive tests report. Then, the terminal device chooses to camp on the third cell in the descending order of signal strength (or in the descending order of signal quality) to implement downlink synchronization, and obtains a network slice identifier list of the third cell by listening to a system information broadcast of the third cell. The network slice identifier list of the third cell does not include the network slice A, and it is learned that the third cell does not support the network slice service initiated by the terminal device either. Then, the terminal device records related network slice information of the third cell in the logged minimization of drive tests report, that is, retains the related network slice information of the first cell and the related network slice information of the second cell, and also records the related network slice information of the third cell in the logged minimization of drive tests report. The foregoing process continues until the terminal device establishes a connection in the fourth cell and sends the logged minimization of drive tests report to the fourth cell. For the first cell, the related network slice information stored in the logged minimization of drive tests report is an identifier of the first cell, information indicating that the first cell does not support the network slice service initiated by the terminal device, location information of the terminal device when the terminal device receives a system message of the candidate access cell, and a network slice identifier corresponding to the network slice service initiated by the terminal device.

Specifically, the report result generated by the terminal device in S101 includes at least one of a logged minimization of drive tests report, an RLF report, and an RACH report. The logged minimization of drive tests report includes an identifier of a candidate access cell, information indicating whether the candidate access cell supports the network slice service initiated by the terminal device, location information of the terminal device when the terminal device receives a system message of the candidate access cell, and a network slice identifier corresponding to the network slice service initiated by the terminal device. The location information of the terminal device when the terminal device receives the system message of the candidate access cell may be global positioning system (global positioning system, GPS) location information of the terminal device when the terminal device receives the system message.

The information indicating whether the candidate access cell supports the network slice service initiated by the terminal device may be: the network slice identifier corresponding to the network slice service initiated by the terminal device and a network slice identifier corresponding to a network slice supported by a radio access network device to which the candidate access cell belongs. For example, the network slice identifier corresponding to the network slice service initiated by the terminal device is 1, and network slice identifiers corresponding to the network slice supported by the radio access network device to which the candidate access cell belongs include 1, 2, and 3. There is 1 therein, and therefore it can be learned that the candidate access cell supports the network slice service initiated by the terminal device. If there is no 1, it can be learned that the candidate access cell does not support the network slice service initiated by the terminal device.

Alternatively, the information indicating whether the candidate access cell supports the network slice service initiated by the terminal device may be: the network slice identifier corresponding to the network slice service initiated by the terminal device and indication information indicating whether a radio access network device to which the candidate access cell belongs supports the network slice service initiated by the terminal device. For example, the indication information indicating whether the radio access network device to which the candidate access cell belongs supports the network slice service initiated by the terminal device is a Boolean option, that is, "yes" or "no", or information indicating "yes" or "no". For example, 1 indicates "yes" and 0 indicates "no".

Alternatively, the information indicating whether the candidate access cell supports the network slice service initiated by the terminal device may be: a network slice identifier corresponding to a network slice supported by a radio access network device to which the candidate access cell belongs and indication information indicating whether the terminal device needs to initiate the network slice service supported by the radio access network device. For example, the indication information indicating whether the terminal device needs to initiate a network slice service supported by the radio access network device is a Boolean option, that is "yes" or "no", or information indicating "yes" or "no". For example, 1 indicates "yes" and 0 indicates "no".

Further, in an implementable manner, the logged minimization of drive tests report may further include at least one of network slice remapping information of the candidate access cell and network slice redirection information of the candidate access cell. For example, the terminal device learns of the network slice remapping information of the candidate access cell and the network slice redirection information of the candidate access cell by listening to a system information broadcast. Network slice remapping means that one or more pieces of corresponding network slice information are provided for a protocol data unit (PDU) session of the terminal device. For example, one PDU session identifier corresponds to one or more network slice identifiers, and the PDU session may be initiated by selecting one of network slices corresponding to the one or more network slice identifiers. The logged minimization of drive tests report carries the network slice remapping information of the candidate access cell, and the radio access network device that receives the report result sent by the terminal device may adjust new network slice remapping information based on the network slice remapping information (namely, the network slice remapping information of the candidate access cell included in the logged minimization of drive tests report) originally stored by the terminal device, and may send the new network slice remapping information to the terminal device by using a radio resource control (RRC) message, so that the terminal device successfully initiates the network slice service. For example, the following Table 1 shows the network slice remapping information originally stored by the terminal device and the adjusted network slice remapping information. The network slice remapping information originally stored by the terminal device is that a PDU session 1 corresponds to a network slice 1, a network slice 2, and a network slice 3. The radio access network device learns, based on the received report result of the terminal device, that the network slice 1 actually needs to access a small quantity of terminal devices, but a network slice 4 actually needs to access a large quantity of terminal devices. Therefore, the network slice remapping information may be adjusted based on the learned information. Adjusted network slice remapping information is that the PDU session 1 corresponds to the network slice 4, the network slice 2, and the network slice 3. The radio access network device sends the adjusted network slice remapping information to the terminal device by using the RRC message, so that the terminal device can successfully initiate the network slice service, to increase a probability of accessing the network slice by the terminal device.

TABLE 1

Network slice remapping information

| Original network slice remapping information | PDU session 1 | Network slice 1 |
| --- | --- | --- |
| | | Network slice 2 |
| | | Network slice 3 |
| Adjusted network slice remapping information | PDU session 1 | Network slice 4 |
| | | Network slice 3 |
| | | Network slice 2 |

Network slice redirection means that the radio access network device redirects the terminal device to a cell that supports the network slice service, to initiate a corresponding network slice service. The logged minimization of drive tests report carries the network slice redirection information of the candidate access cell, and the radio access network device that receives the report result sent by the terminal device may redirect the terminal device to the cell that supports the network slice service, to initiate the corresponding network slice service. The following Table 2 shows original network slice redirection information (namely, the network slice redirection information of the candidate access cell in the logged minimization of drive tests report) and adjusted network slice redirection information. In the original network slice redirection information, cells supporting a network slice 1 are a cell 1, a cell 2, and a cell 3. The radio access network device learns, based on the received report result of the terminal device, that a relatively small quantity of terminal devices actually need to access the cell 1, but a relatively large quantity of terminal devices actually need to access a cell 4. Therefore, the network slice redirection information may be adjusted based on the learned information. In the adjusted network slice redirection information, cells supporting the network slice 1 are the cell 4, the cell 2, and the cell 3, so that the terminal device can successfully access the cell 4, to increase a probability of accessing the network slice by the terminal device.

TABLE 2

Network slice redirection information

| Original network slice redirection information | Network slice 1 | Cell 1 |
| --- | --- | --- |
| | | Cell 2 |
| | | Cell 3 |
| Adjusted network slice redirection information | Network slice 1 | Cell 4 |
| | | Cell 3 |
| | | Cell 2 |

Optionally, Table 3 shows a possible message structure of a logged minimization of drive tests report, as shown in Table 3:

TABLE 3

Message structure of a logged minimization of drive tests report

Logged minimization of drive tests report
>Network slice identifier corresponding to a network slice service initiated by a terminal device
>Identifier of a candidate access cell
>Whether a candidate access cell supports a network slice service initiated by a terminal device
>Information indicating signal strength and signal quality of a candidate access cell
>Location information of a terminal device when the terminal device receives a system message of a candidate access cell
>Network slice remapping information of a candidate access cell
>Network slice redirection information of a candidate access cell
>Timestamp
>Trace reference information
>Trace record session
>Parameter trace collection entity identity information
>Related information list The RLF report includes an identifier of an already accessed cell in which the radio link failure occurs and the network slice identifier corresponding to the network slice service initiated by the terminal device. The RACH report includes an identifier of an already accessed cell and the network slice identifier corresponding to the network slice service initiated by the terminal device. The network slice identifier corresponding to the network slice service initiated by the terminal device may be single network slice selection assistance information (S-NSSAI) mentioned in an existing 3GPP protocol, or may be another identifier that can identify a type of a network slice service that the terminal device expects to initiate.

Optionally, Table 4 shows a possible message structure of an RLF report, as shown in Table 4:

TABLE 4

Message structure of an RLF report

RLF report

>Network slice identifier corresponding to a network slice service initiated by a terminal device
>Identifier of an already accessed cell in which a radio link failure occurs
Identifier of a cell to be reestablished
Time period from a time point when handover starts to a time point when a connection fails
Time period from a time point when a connection fails to a current time point
Connection failure type (an RLF or a handover failure)
Location information
Absolute radio frequency channel number
Frequency and bandwidth for random access
Subcarrier spacing
Start frequency of a message 1
Subcarrier spacing of a message 1
Frequency division multiplexing status of a message 1
Random access order Optionally, Table 5 shows a possible message structure of an RACH report, as shown in Table 5:

TABLE 5

Message structure of an RACH report

RACH report

>Network slice identifier corresponding to a network slice service initiated by a terminal device
>Identifier of an already accessed cell
Absolute radio frequency channel number
Frequency and bandwidth for random access
Subcarrier spacing
Related information list
Start frequency of a message 1
Subcarrier spacing of a message 1
Frequency division multiplexing status of a message 1
Random access order
Purpose of random access Based on the foregoing process of generating the report result, it may be understood that a quantity of logged minimization of drive tests reports included in the report result may be one or more, a quantity of RLF reports may be one or more, and a quantity of RACH reports may be one or more.

It is stipulated in a current standard that the terminal device has constraints on a quantity of carried RACH reports and duration of carrying an RACH report. For example, the terminal device may carry a maximum of eight RACH reports, and carry an RACH report for a maximum of 48 hours. When the specified quantity of carried RACH reports and the specified duration of carrying an RACH report are exceeded, the terminal device deletes some RACH reports. Therefore, it is difficult to fully utilize the RACH report. To resolve this problem, in this embodiment, in an implementable manner, when the terminal device determines that one or more already stored RACH reports satisfy a preset condition, the terminal device deletes the one or more already stored RACH reports in ascending order of importance. The preset condition may be that the quantity of the carried RACH reports is greater than or equal to a preset threshold, or the duration of carrying the RACH report is greater than or equal to a preset threshold. For example, if the quantity of the carried RACH reports is greater than eight, the duration of carrying the RACH report is greater than 48 hours, or both are satisfied, it is determined that the preset condition is satisfied. A condition for determining importance of the RACH report may be: Importance of an RACH report of a cell that supports the network slice service initiated by the terminal device is higher than importance of an RACH report of a cell that does not support the network slice service initiated by the terminal device. Alternatively, importance of an RACH report of a cell having good signal quality (or high signal strength) is higher than importance of an RACH report of a cell having bad signal quality (or low signal strength). The one or more already stored RACH reports are deleted in ascending order of importance, so that storage time of an RACH report of high importance can be prolonged, to fully utilize the RACH report.

S102. The terminal device sends the report result to the radio access network device to which a serving cell belongs.

The serving cell is a cell that is successfully accessed by the terminal device by initiating random access.

Specifically, in a new radio (new radio, NR) protocol, the terminal device has three modes: an RRC idle mode (RRC IDLE), an RRC connected mode (RRC connected), and an RRC inactive mode (RRC inactive). The terminal device may send, in the connected mode and the inactive mode, the report result to the radio access network device to which the serving cell belongs. Specifically, in an implementable manner, the terminal device may send, in the connected mode, the report result to the radio access network device to which the serving cell belongs. In this case, S102 may be for example:

After the terminal device successfully performs random access to the serving cell, the terminal device sends the logged minimization of drive tests report to the radio access network device to which the serving cell belongs. After the terminal device successfully performs random access to the serving cell, the radio access network device may send an RACH report request to the terminal device, and the terminal device sends the RACH report to the radio access network device based on the RACH report request. After the terminal device successfully performs random access to the serving cell, the radio access network device sends an RLF report request to the terminal device, and the terminal device sends the RLF report to the radio access network device based on the RLF report request.

In another implementable manner, the terminal device may send, in the inactive mode, the report result to the radio access network device to which the serving cell belongs. When the terminal device is in the inactive mode, the terminal device may directly send small data to the radio access network device without establishing an RRC connection to the radio access network device. In this case, S102 may be specifically:

The terminal device sends small data to the radio access network device, where the small data carries the report result. In other words, the terminal device places the report result in the small data and sends the small data to the radio access network device.

After the radio access network device to which the serving cell belongs receives the report result sent by the terminal device, there are two implementable manners. In one implementable manner, S103 is then performed. In another implementable manner, S103' is then performed.

S103. The radio access network device to which the serving cell belongs stores the report result sent by the terminal device, and forwards the report result to another radio access network device.

For example, the radio access network device to which the serving cell belongs may forward, through a network side interface (X-n) interface between radio access network devices, the report result to all or a part of radio access network devices that establish the X-n interface with the radio access network device to which the serving cell belongs, and the another radio access network device forwards, through the X-n interface, the report result to a radio access network device to which the radio access network device establishes the X-n interface.

S104. The radio access network device determines updated network slice configuration information based on the report result that is of at least one terminal device and that is received within a preset time period.

For example, the updated network slice configuration information may include a network slice identifier list. First, the radio access network device determines the network slice identifier list based on the logged minimization of drive tests report, the RLF report, and the RACH report in the report result that is of the at least one terminal device and that is received within the preset time period. For example, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

It should be noted that the radio access network device performing S104 may be the radio access network device to which the serving cell belongs. The radio access network device to which the serving cell belongs may alternatively receive a report result that is of another terminal device and that is forwarded by another radio access network device. The radio access network device performing S104 may alternatively be another radio access network device that receives the report result of the at least one terminal device.

For example, the radio access network device determines the network slice identifier list based on the logged minimization of drive tests report, the RLF report, and the RACH report in the report result that is of the at least one terminal device and that is received within the preset time period. The network slice identifier list is an updated network slice identifier list. Because the logged minimization of drive tests report carries the identifier of the candidate access cell, the information indicating whether the candidate access cell supports the network slice service initiated by the terminal device, the location information of the terminal device when the terminal device receives the system message of the candidate access cell, and the network slice identifier corresponding to the network slice service initiated by the terminal device, the radio access network device may learn, based on the logged minimization of drive tests report, of whether each candidate access cell supports the network slice service initiated by the terminal device, the network slice service initiated by the terminal device in a corresponding candidate access cell, and the location information of the terminal device when the terminal device receives the system message of the candidate access cell. Because the RLF report carries the identifier of the already accessed cell in which the radio link failure occurs and the network slice identifier corresponding to the network slice service initiated by the terminal device, the radio access network device may learn, based on the RLF report, of the network slice identifier corresponding to the network slice service initiated by the terminal device in the already accessed cell in which the radio link failure occurs. Because the RACH report carries the identifier of the already accessed cell and the network slice identifier corresponding to the network slice service initiated by the terminal device, the radio access network device may learn, based on the RACH report, of the network slice identifier corresponding to the network slice service initiated by the terminal device in the already accessed cell. Therefore, the radio access network device may determine, based on related network slice information learned of from at least one of the three reports, whether a network slice supported by the radio access network device needs to be adjusted. If the network slice needs to be adjusted, the network slice supported by the radio access network device is adjusted. For example, the radio access network device may modify a network slice identifier corresponding to the network slice that can be supported by the radio access network device, namely, the network slice identifier list. A modified network slice identifier list includes the network slice identifier corresponding to the network slice service initiated by the terminal device in a cell controlled by the radio access network device. Therefore, the network slice identifier list corresponding to the network slice supported by the radio access network device after adjustment includes the network slice identifier corresponding to the network slice service initiated by the terminal device. For example, for the RACH report, if the RACH report carries an identifier of an already accessed first cell and a network slice identifier 1 corresponding to the network slice service initiated by the terminal device, it indicates that in the first cell, the terminal device has successfully initiated the network slice service corresponding to the network slice identifier 1, and the radio access network device determines that the network slice identifier 1 does not need to be modified. Specifically, the radio access network device retains the network slice identifier 1 in the network slice list supported by the radio access network device. For the logged minimization of drive tests report and the RLF report, a network slice service corresponding to the logged minimization of drive tests report is a network slice service that is not successfully initiated, and a network slice service corresponding to the RLF report is a network slice service that is initiated by the terminal device but in which the radio link failure occurs. The radio access network device determines, based on the logged minimization of drive tests report and the RLF report, that adjusting the network slice supported by the radio access network device is needed. For example, if a network slice identifier that corresponds to the network slice service initiated by the terminal device and that is carried in the logged minimization of drive tests report is 2, when the radio access network device adjusts the network slice supported by the radio access network device, the radio access network device specifically adjusts a priority sequence of the network slice identifier 2 in the network slice list supported by the radio access network device, to reduce a priority of the network slice identifier 2. Alternatively, if a network slice identifier that corresponds to the network slice service initiated by the terminal device and that is carried in the RLF report is 3, when the radio access network device adjusts the network slice supported by the radio access network device, the radio access network device specifically adjusts a priority sequence of the network slice identifier 3 in the network slice list supported by the radio access network device, to reduce a priority of the network slice identifier 2, to improve a success rate of accessing the network slice by the terminal device.

It should be noted that after the radio access network device modifies the network slice identifier list corresponding to the network slice supported by the radio access network device, the radio access network device further needs to modify a current configuration, for example, a data radio bearer, a spectrum bandwidth configuration, a carrier configuration, and a modulation and demodulation scheme configuration supported by the radio access network device. In addition, the radio access network device further needs to send configuration update information (config update) to a core network device (for example, an AMF), where the configuration update information includes the network slice identifier list modified by the radio access network device, and is used to notify the core network device that the network slice identifier list supported by the radio access network device is already changed.

S105. The radio access network device sends the updated network slice configuration information to the terminal device.

For example, the updated network slice configuration information may include the network slice identifier list in S104, and the radio access network device may broadcast the updated network slice configuration information to the terminal device by using the system message. The radio access network device may directly add (or update) the network slice identifier list to a system message SIB 1.

In an embodiment, further, on the basis of the foregoing method, the method may further include the following steps.

S106. The radio access network device determines updated network slice remapping information based on the report result and the updated network slice configuration information, and the radio access network device sends the updated network slice remapping information to the terminal device. Specifically, the radio access network device determines the updated network slice remapping information based on the report result and the network slice that can be supported by the radio access network device in the updated network slice configuration information. For example, an original remapping relationship stored by the terminal device is that mapping is from a network slice service 1 to a network slice service 2 or a network slice service 3. However, the current radio access network device supports only a network slice service 4, and does not support the network slice service 1, the network slice service 2, and the network slice service 3. Therefore, the radio access network device determines that the updated network slice remapping information is: A new mapping relationship is that "mapping is from the network slice service 1 to a slice list including the network slice 4". The radio access network device may send the updated network slice remapping information to the terminal device by using the RRC message, so that the terminal device can successfully initiate the network slice service.

In an embodiment, further, the updated network slice configuration information may further include adjustment information of access control information of the network slice service. The adjustment information of the access control information of the network slice service is carried, so that a probability that the terminal device accesses a non-network slice service can be reduced, and the terminal device preferentially accesses a network slice service.

Optionally, the adjustment information of the access control information of the network slice service may be the system message. The radio access network device updates an access control parameter set list (uac-barring infosetList) information element in the SIB 1. Specifically, there are the following four optional manners:

1. An access control identifier (ID) related to the network slice service is deleted from unified access control-barring for access identity (uac-barring for access identity) information in the system message.
2. An access control ID unrelated to the network slice service is added to unified access control-barring for access identity (uac-barring for access identity) information in the system message. For example, an access identity sequence (access identity numbers) 3-10 (an originally reserved part) may be defined as the access control ID related to the network slice service, to form a new access ID list. The list is prestored in the terminal device and the radio access network device. Table 6 shows a possible access ID list, as shown below.

TABLE 6

Access ID list

| Access ID List | Terminal device configuration |
| --- | --- |
| ... | ... |
| 3 | A network slice service 1 is configured for a terminal device |
| 4 | A network slice service 2 is configured for a terminal device |
| ... | ... |

3. A value of a unified access control-barring factor (uac-barring factor) information element that is in the system message and that corresponds to the network slice service decreases within a preset range, so that a probability that a service unrelated to the network slice is allowed to access a network can be properly reduced.
4. If a value of a unified access control time (uac-barring time) information element that is in the system message and that corresponds to the network slice service increases within a preset range, duration required for accessing a network by a service related to the network slice may be properly increased.

The access control parameter set list represents the access control parameter set list. The unified access control-barring for access identity information represents a type of access identity (access id) corresponding to the access control list, and the access ID represents types of access events initiated by the terminal device (including the type of the network slice service initiated by the terminal device). An access ID is assigned to each terminal device during network registration. The unified access control-barring factor indicates a probability that a terminal device having this type of access ID is allowed to make an access attempt during an access restriction check. Unified access control time indicates shortest time that elapses after the terminal device having this type of access ID is barred from accessing and before a new access attempt is made. In addition, an access ID that does not appear in the access control parameter set list indicates that the access is not restricted by the network.

In an embodiment, further, on the basis of the foregoing method, the method may further include the following steps.

S107. The radio access network device sends adjustment information of an access category to the terminal device, where the adjustment information of the access category is used to add the access category related to the network slice service; or the radio access network device prestores adjustment information of an access category.

For example, Table 7 shows a possible access category (access category) list, as shown below.

| Access category list | | | |
| --- | --- | --- | --- |
| Rule # | Type of access attempt | Requirement to be met | Access category |
| ... | | | |
| 11 | Network slice service | A terminal device initiates a network slice service 1 | 8 |
| ... | | | |

The radio access network device sends the adjustment information of the access category to the terminal device, or the radio access network device and the terminal device prestore the adjustment information of the access category. The adjustment information of the access category is used to add the access category related to the network slice service, so that a probability of accessing the network slice by the terminal device can be increased, and a probability of accessing the non-network slice service by the terminal device can be reduced.

According to the data transmission method provided in this embodiment, a terminal device generates a report result, and sends the report result to a radio access network device to which a serving cell belongs, where the report result includes at least one of a minimization of drive tests report, an RLF report, and an RACH report. All the minimization of drive tests report, the RLF report, and the RACH report carry information related to a network slice service, the radio access network device may learn, based on the logged minimization of drive tests report, of whether each candidate access cell supports a network slice service initiated by the terminal device and a network slice identifier corresponding to the network slice service initiated by the terminal device in a corresponding candidate access cell. The radio access network device may learn, based on the RLF report, of a network slice identifier corresponding to a network slice service initiated by the terminal device in a cell that is already accessed by the terminal device and in which a radio link failure occurs. The radio access network device may learn, based on the RACH report, of the network slice identifier corresponding to the network slice service initiated by the terminal device in the already accessed cell. Therefore, the radio access network device may adjust a network slice supported by the radio access network device when determining, based on related network slice information learned of from the at least one of the three reports, that the network slice supported by the radio access network device needs to be adjusted, to resolve a problem of how the terminal device reports the report result in a scenario in which different network slices support different services. Further, the radio access network device may adjust the network slice supported by the radio access network device when determining, based on the report result reported by the terminal device, that the network slice supported by the radio access network device needs to be adjusted, to improve a success rate of accessing the network slice by the terminal device.

Figure 4:
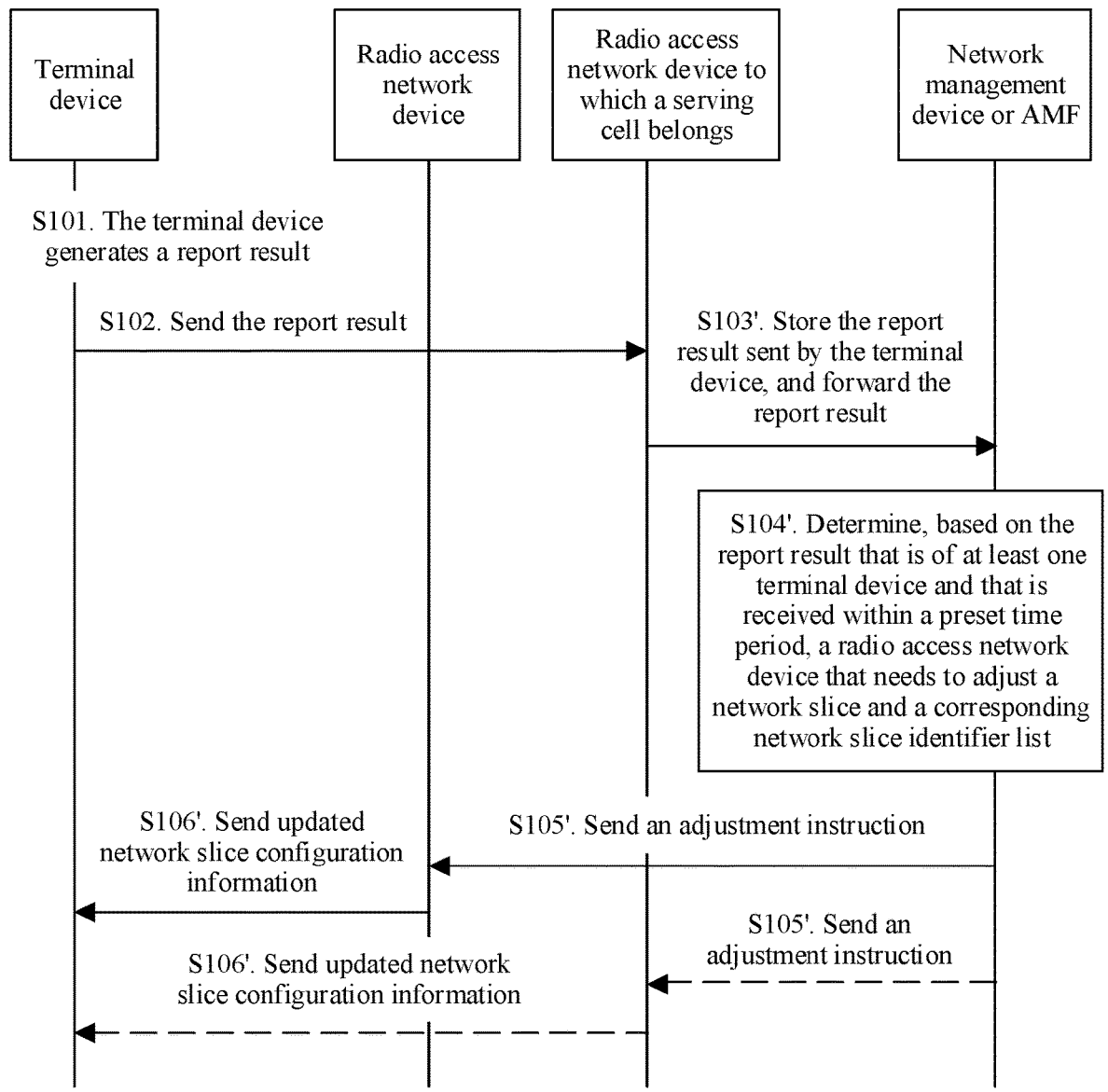
FIG. 4 is an interaction flowchart of an embodiment of a data transmission method according to this application.

FIG. 4 is an interaction flowchart of an embodiment of a data transmission method according to this application. As shown in FIG. 4, a difference from the embodiment shown in FIG. 2 lies in that in the embodiment shown in FIG. 2, the radio access network device determines, based on the report result that is of the at least one terminal device and that is received within the preset time period, that the network slice supported by the radio access network device needs to be adjusted and determines how to adjust. In this embodiment, the radio access network device sends the report result to a network management device or an AMF, the network management device or the AMF determines, based on the report result that is of the at least one terminal device and that is received within the preset time period, which radio access network device needs to adjust a network slice service and how to adjust the network slice service. The following provides detailed descriptions. As shown in FIG. 4, after S102, the method in this embodiment may further include the following steps.

S103'. The radio access network device stores the report result, and sends the report result to the network management device or the AMF.

S104'. The network management device or the AMF determines, based on the report result that is of the at least one terminal device and that is received within the preset time period, the radio access network device that needs to adjust the network slice and a corresponding network slice identifier list.

For example, the network management device or the AMF may perform statistical analysis and judgment, to determine, based on the logged minimization of drive tests report, the RLF report, and the RACH report in the report result that is of the at least one terminal device and that is received within the preset time period, the radio access network device that needs to adjust the network slice. The determined radio access network device that needs to adjust the network slice may be a radio access network device to which a cell in a RAN-based notification area (RAN-based notification area) list belongs, may be a radio access network device to which a cell in a tracking area (tracking area, TA) list belongs, or another radio access network device to which a cell in a cell list configured by a network management system belongs. This is not specifically limited in this embodiment.

Optionally, the network management device performs statistical analysis and judgment, to determine, based on the logged minimization of drive tests report, the RLF report, and the RACH report in the report result that is of the at least one terminal device and that is received within the preset time period, the radio access network device that needs to adjust the network slice. This may facilitate network planning and network optimization. This is not specifically limited in this embodiment.

Figure 5:
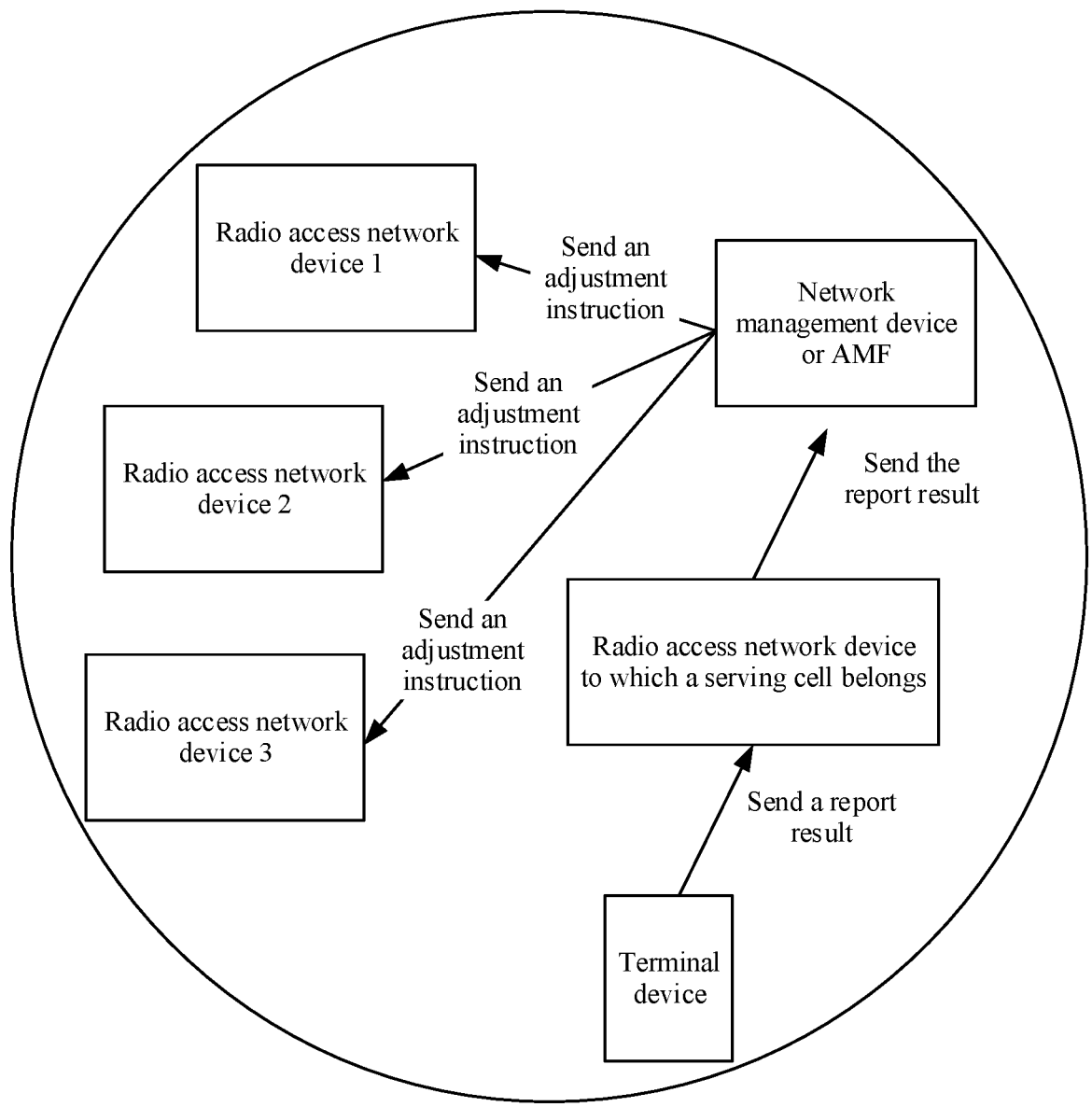
FIG. 5 is a schematic diagram of a process in which a network management device or an AMF performs network slice service optimization.

FIG. 5 is a schematic diagram of a process in which the network management device or the AMF performs network slice service optimization. As shown in FIG. 5, the terminal device sends the report result to the radio access network device to which the serving cell belongs, the radio access network device to which the serving cell belongs sends the report result to the network management device or the AMF, and the network management device or the AMF finds, by collecting statistics on report results of terminal devices within a preset time period and a preset range, that a quantity of terminal devices initiating a network slice service 1 is the largest, but a quantity of radio access network devices supporting the network slice service 1 is relatively small within the preset range. Consequently, access experience of the terminal device is poor. Therefore, the network management device or the AMF delivers adjustment instructions to radio access network devices (for example, a radio access network device 1, a radio access network device 2, and a radio access network device 3 shown in the figure) that are near a geographical location of the terminal device and that expect to initiate the network slice 1, to notify the radio access network devices to change another network slice service to the network slice service 1.

S105'. The network management device or the AMF sends the adjustment instruction to the radio access network device, where the adjustment instruction includes an updated network slice identifier list corresponding to the radio access network device.

Optionally, the adjustment instruction may further include adjustment for a signal of the radio access network device. The radio access network device herein may be the radio access network device to which the serving cell belongs, or may be another radio access network device.

S106'. The radio access network device sends updated network slice configuration information to the terminal device.

For example, the updated network slice configuration information may include the network slice identifier list carried by the adjustment instruction. The network slice identifier list includes a network slice identifier corresponding to a network slice service that can be supported by the radio access network device, and the network slice identifier list includes the network slice identifier corresponding to the network slice service initiated by the terminal device in a cell controlled by the radio access network device.

In an embodiment, further, on the basis of the foregoing method, the method may further include the following steps.

S107'. The radio access network device determines updated network slice remapping information based on the report result and the updated network slice configuration information, and the radio access network device sends the updated network slice remapping information to the terminal device.

Specific related descriptions are the same as the related descriptions of S106 in the embodiment shown in FIG. 2, and details are not described herein again.

In an embodiment, further, the updated network slice configuration information may further include adjustment information of access control information of the network slice service. The adjustment information of the access control information of the network slice service is a system message. An access control identifier ID related to the network slice service is deleted from unified access control-barring for access identity information in the system message. Alternatively, an access control ID unrelated to the network slice service is added to unified access control-barring for access identity information in a system message. Alternatively, a value of a unified access control-barring factor information element in a system message decreases within a preset range. Alternatively, a value of a unified access control time information element in a system message increases within a preset range.

Specific related descriptions are the same as the related descriptions in the embodiment shown in FIG. 2, and details are not described herein again.

In an embodiment, further, on the basis of the foregoing method, the method may further include the following steps.

S108'. The radio access network device sends adjustment information of an access category to the terminal device, where the adjustment information of the access category is used to add the access category related to the network slice service; or the radio access network device prestores adjustment information of an access category.

Specific related descriptions are the same as the related descriptions of S107 in the embodiment shown in FIG. 2, and details are not described herein again.

The foregoing several embodiments are all manners in which the radio access network device adjusts the network slice service of the radio access network device. After receiving the report result of the terminal device, in addition to adjusting the network slice service of the radio access network device, the radio access network device may further perform the following adjustment. Further, the method in this embodiment may further include:

S109'. The radio access network device adjusts, based on the report result that is of the at least one terminal device and that is received within the preset time period, transmit signal power of at least one network slice supported by the radio access network device, where the transmit signal power may be, for example, at least one of power of an SSB, power of a CSI-RS, and power of RSRP of an SUL.

The radio access network device adjusts, based on the report result that is of at least one terminal device and that is received within the preset time period, the transmit signal power of the at least one network slice supported by the radio access network device. For example, the radio access network device supports a network slice 1, a network slice 2, and a network slice 3. The radio access network device learns, based on the report result that is of the at least one terminal device and that is received within the preset time period, that a relatively large quantity of terminal devices access the network slice 1 and a relatively small quantity of terminal devices access the network slice 2. Transmit signal power of the network slice 1 is increased and transmit signal power of the network slice 2 is reduced, so that a probability of accessing the network slice by the terminal device can be increased.

S110'. The radio access network device adjusts, based on the report result that is of the at least one terminal device and that is received within the preset time period, an RACH resource of at least one network slice supported by the radio access network device.

The radio access network device adjusts, based on the report result that is of the at least one terminal device and that is received within the preset time period, the RACH resource of the at least one network slice supported by the radio access network device, so that an access probability of the terminal device initiating the network slice service can be increased, an access speed of the terminal device initiating the network slice service can be increased, and a probability and quantity of random access failures of the terminal device initiating the network slice service can be reduced.

Alternatively, both S109' and S110' may be performed.

According to the data transmission method provided in this embodiment, a terminal device generates a report result, and sends the report result to a radio access network device to which a serving cell belongs, where the report result includes at least one of a minimization of drive tests report, an RLF report, and an RACH report, and all the minimization of drive tests report, the RLF report, and the RACH report carry information related to a network slice service. The radio access network device sends the received report result to a network management device or an AMF. The network management device or the AMF may learn, based on the logged minimization of drive tests report, of whether each candidate access cell supports a network slice service initiated by the terminal device and a network slice identifier corresponding to the network slice service initiated by the terminal device in a corresponding candidate access cell. The network management device or the AMF may learn, based on the RLF report, of a network slice identifier corresponding to a network slice service initiated by the terminal device in a cell that is already accessed by the terminal device and in which a radio link failure occurs. The network management device or the AMF may learn, based on the RACH report, of the network slice identifier corresponding to the network slice service initiated by the terminal device in the already accessed cell. Therefore, the network management device or the AMF may determine, based on the report result that is of at least one terminal device and that is received within a preset time period, which radio access network device needs to adjust a network slice service and how to adjust the network slice service, and send an adjustment instruction to the radio access network device that needs to adjust the network slice, so that the radio access network device adjusts, based on the adjustment instruction, a network slice supported by the radio access network device, to resolve a problem of how the terminal device reports the report result in a scenario in which different network slices support different services. Further, the radio access network device may adjust the network slice supported by the radio access network device, to improve a success rate of accessing a network slice by the terminal device. Compared with the embodiment that is shown in FIG. 2 and in which the radio access network device determines whether to adjust and how to adjust the network slice supported by the radio access network device, this embodiment shows that the network management device or the AMF determines which radio access network device needs to adjust the network slice service and how to adjust the network slice service, and accuracy is higher. Because the network management device or the AMF may obtain report results of respective terminal devices of a plurality of radio access network devices, centralized decision-making may be performed, to improve overall network experience in an area.

Figure 6:
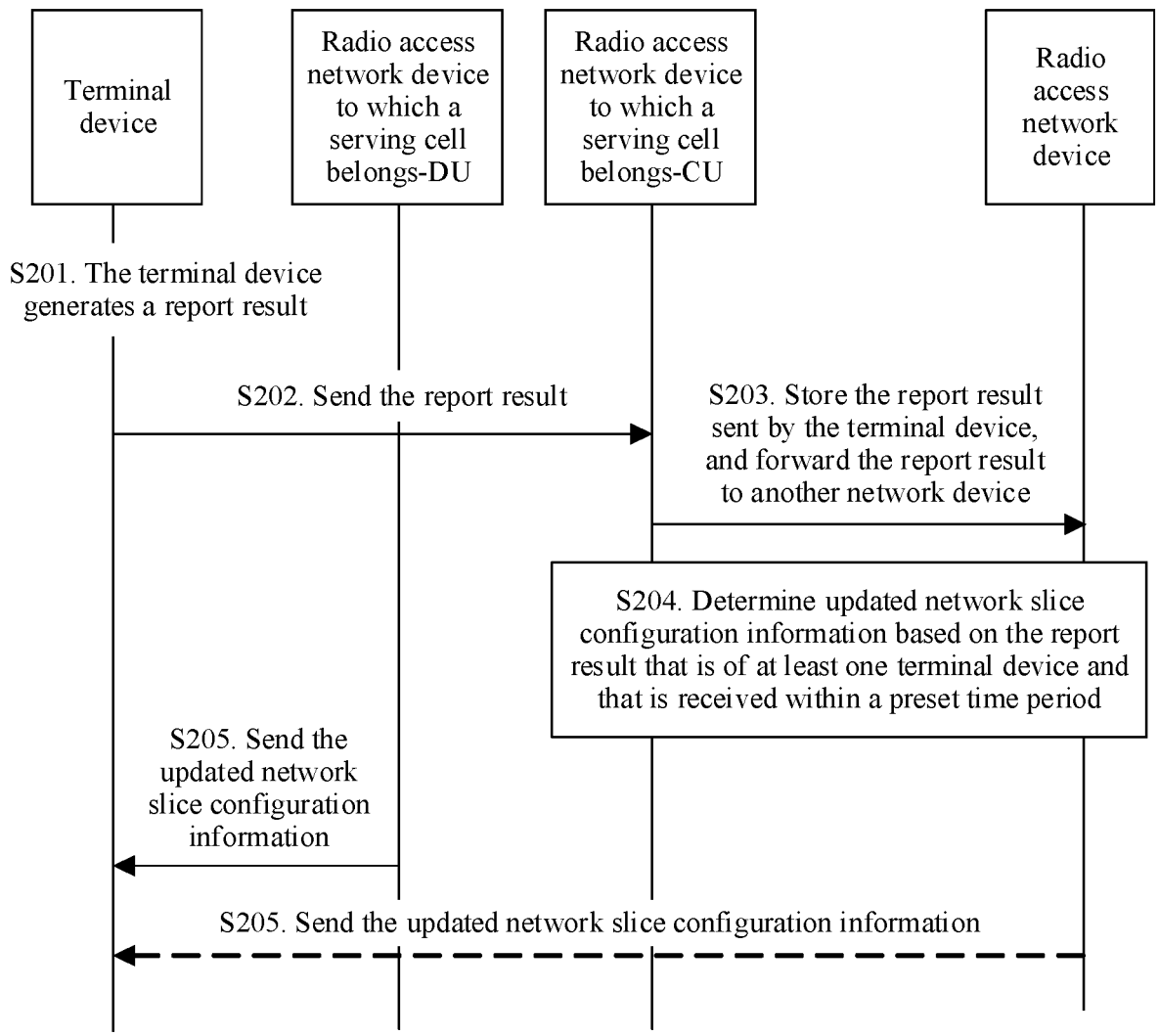
FIG. 6 is an interaction flowchart of an embodiment of a data transmission method according to this application.
Figure 7:
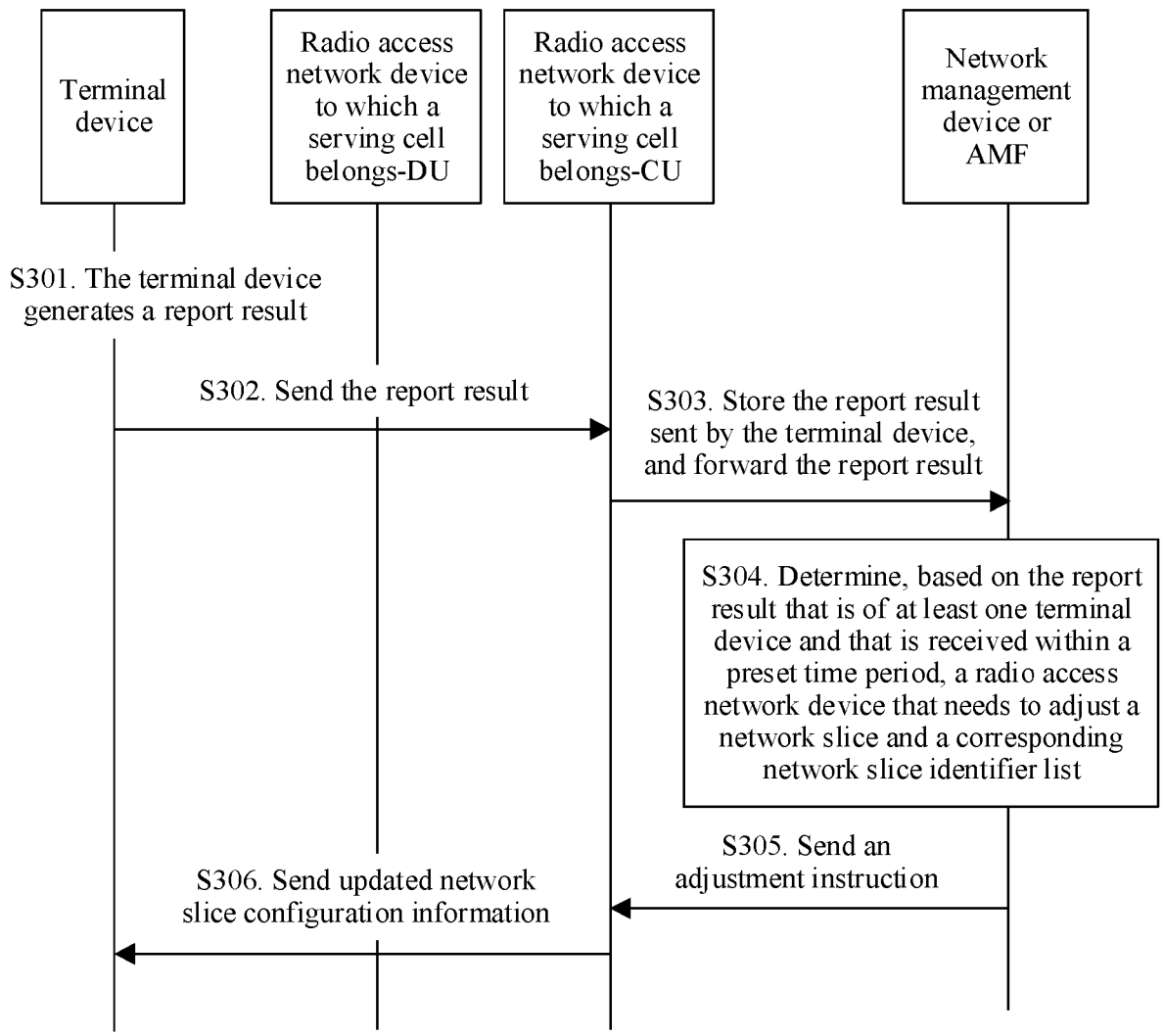
FIG. 7 is an interaction flowchart of an embodiment of a data transmission method according to this application.

For the data transmission method provided in this embodiment, in a split architecture of a centralized unit (central unit, CU) and a distributed unit (DU) of the radio access network device, how the terminal device reports the report result and how the radio access network device adjusts the network slice supported by the radio access network device are described below with reference to FIG. 6 and FIG. 7. An embodiment shown in FIG. 6 is a process in which the radio access network device determines whether to adjust the network slice supported by the radio access network device in the CU-DU split architecture. An embodiment shown in FIG. 7 is a process in which the network management device or the AMF determines, in the CU-DU split architecture, which radio access network device needs to adjust the network slice service and how to adjust the network slice service. The following provides detailed descriptions.

First, the CU-DU split architecture is briefly described. The CU and the DU may be understood as division of the radio access network device from a perspective of a logical function. The CU and the DU may be physically separated or deployed together. A plurality of DUs may share one CU. One DU may be connected to a plurality of CUs. The CU and the DU may be connected through an interface, for example, an F1 interface. The CU and the DU may be obtained through division based on a protocol layer of a wireless network. For example, functions of an RRC layer, a service data adaptation protocol (SDAP) stack, and a packet data convergence protocol (PDCP) layer are provided on the CU, and functions of a radio link control (, RLC) layer, a media access control (MAC) layer, a physical (physical, PHY) layer, and the like are provided on the DU. It may be understood that division of processing functions of the CU and the DU performed based on the protocol layers is merely an example, and the division may alternatively be in another manner. For example, the CU or the DU may have functions of more protocol layers through division. For example, the CU or the DU may alternatively have some processing functions of the protocol layers through division. In a design, some functions of the RLC layer and a function of a protocol layer above the RLC layer are provided on the CU, and other functions of the RLC layer and a function of a protocol layer below the RLC layer are provided on the DU. In another design, functions of the CU or the DU may alternatively be obtained through division based on a service type or another system requirement. For example, division is performed based on a latency, a function whose processing time needs to meet a latency requirement is provided on the DU, and a function whose processing time does not need to meet the latency requirement is provided on the CU. In another design, the CU may alternatively have one or more functions of a core network. One or more CUs may be centrally or separately disposed. For example, the CU may be disposed on a network side for ease of centralized management. The DU may have a plurality of radio frequency functions, or the radio frequency functions may be configured remotely.

FIG. 6 is an interaction flowchart of an embodiment of a data transmission method according to this application. As shown in FIG. 6, the method in this embodiment may include the following steps.

S201. A terminal device generates a report result.

For example, detailed related descriptions of generating the report result by the terminal device are the same as the descriptions of S101 in the embodiment shown in FIG. 2. Refer to the descriptions of S101. Details are not described herein again.

S202. The terminal device transparently transmits, by using a DU of a radio access network device to which a current serving cell belongs, the report result to a CU of the radio access network device to which the current serving cell belongs.

Optionally, if the terminal device learns, by using a system information broadcast, that the current serving cell does not support a network slice service, the terminal device may choose to send only a report result of a part that is not related to the network slice service.

S203. The CU of the radio access network device to which the current serving cell belongs stores the report result sent by the terminal device, and forwards the report result to another radio access network device.

S204. The radio access network device determines updated network slice configuration information based on the report result that is of at least one terminal device and that is received within a preset time period.

It should be noted that the radio access network device performing S204 may be the radio access network device to which the serving cell belongs. The radio access network device to which the serving cell belongs may alternatively receive a report result that is of another terminal device and that is forwarded by another radio access network device. The radio access network device performing S204 may alternatively be another radio access network device that receives the report result of the at least one terminal device. In a CU-DU split structure of each radio access network device, there are the following two embodiments in S204:

Manner 1: The CU makes a decision. For example, the CU of the radio access network device determines the updated network slice configuration information based on the report result that is of the at least one terminal device and that is received within the preset time period, and then sends the updated network slice configuration information or the updated network slice configuration information and the report result to the DU through an F1 interface. The DU sends the updated network slice configuration information to the terminal device by using an SIB 1.

In Manner 1, further, on the basis of the foregoing method, the method may further include the following steps.

S205. The CU determines updated network slice remapping information based on the report result and the updated network slice configuration information, and the CU sends the updated network slice remapping information to the terminal device. The CU may send the updated network slice remapping information to the terminal device by using an RRC message.

In an embodiment, further, the updated network slice configuration information may further include adjustment information of access control information of the network slice service. Optionally, the adjustment information of the access control information of the network slice service may be a system message. The radio access network device updates an access control parameter set list (uac-barring infosetList) information element in the SIB 1. For example, there are the following four optional manners. For details, refer to the descriptions in the embodiment shown in FIG. 2. Details are not described herein again.

In an embodiment, further, on the basis of the foregoing method, the method may further include the following steps.

S206. The CU sends adjustment information of an access category to the terminal device, where the adjustment information of the access category is used to add the access category related to the network slice service; or the CU prestores adjustment information of an access category.

In addition to the foregoing adjustment for the network slice service of the radio access network device, the following adjustment may be further performed. Further, the method in this embodiment may further include the following steps.

S207. The CU adjusts, based on the report result that is of the at least one terminal device and that is received within the preset time period, transmit signal power of at least one network slice supported by the radio access network device, where the transmit signal power may be, for example, at least one of power of an SSB, power of a CSI-RS, and power of RSRP of an SUL.

S208. The CU adjusts, based on the report result that is of the at least one terminal device and that is received within the preset time period, an RACH resource of at least one network slice supported by the radio access network device. Alternatively, adjustment information of the RACH resource may be sent to the terminal device by using the RRC message.

The CU adjusts, based on the report result that is of the at least one terminal device and that is received within the preset time period, the RACH resource of the at least one network slice supported by the radio access network device, so that an access probability of the terminal device initiating the network slice service can be increased, an access speed of the terminal device initiating the network slice service can be increased, and a probability and quantity of random access failures of the terminal device initiating the network slice service can be reduced.

Manner 2: The DU makes a decision. Specifically, the CU sends the report result to the DU through an F1 interface, the DU determines the updated network slice configuration information based on the report result that is of the at least one terminal device and that is received within the preset time period, and the DU sends the updated network slice configuration information to the terminal device by using an SIB 1.

S205'. The DU determines updated network slice remapping information based on the report result and the updated network slice configuration information, the DU sends the updated network slice remapping information to the CU through the F1 interface, and then the CU sends the updated network slice remapping information to the terminal device. The CU may send the updated network slice remapping information to the terminal device by using an RRC message.

In an embodiment further, the updated network slice configuration information may further include adjustment information of access control information of the network slice service. Optionally, the adjustment information of the access control information of the network slice service may be a system message. The radio access network device updates an access control parameter set list information element in the SIB 1. Specifically, there are the following four optional manners. For details, refer to the descriptions in the embodiment shown in FIG. 2. Details are not described herein again.

In an embodiment, further, on the basis of the foregoing method, the method may further include the following steps.

S206'. The DU sends adjustment information of an access category to the CU through the F1 interface, and then the CU sends the adjustment information of the access category to the terminal device, where the adjustment information of the access category is used to add the access category related to the network slice service; or the DU prestores adjustment information of an access category.

In addition to the foregoing adjustment for the network slice service of the radio access network device, the following adjustment may be further performed. Further, the method in this embodiment may further include the following steps.

S207'. The DU adjusts, based on the report result that is of the at least one terminal device and that is received within the preset time period, transmit signal power of at least one network slice supported by the radio access network device, where the transmit signal power may be, for example, at least one of power of an SSB, power of a CSI-RS, and power of RSRP of an SUL.

S208. The DU adjusts, based on the report result that is of the at least one terminal device and that is received within the preset time period, an RACH resource of at least one network slice supported by the radio access network device. The DU may send adjustment information of the RACH resource to the CU through the F1 interface, and the CU sends the adjustment information of the RACH resource to the terminal device by using the RRC message.

The DU adjusts, based on the report result that is of the at least one terminal device and that is received within the preset time period, the RACH resource of the at least one network slice supported by the radio access network device, so that an access probability of the terminal device initiating the network slice service can be increased, an access speed of the terminal device initiating the network slice service can be increased, and a probability and quantity of random access failures of the terminal device initiating the network slice service can be reduced.

FIG. 7 is an interaction flowchart of an embodiment of a data transmission method according to this application. As shown in FIG. 7, the method in this embodiment may include the following steps.

S301. A terminal device generates a report result.

For example, detailed related descriptions of generating the report result by the terminal device are the same as the descriptions of S101 in the embodiment shown in FIG. 2. Refer to the descriptions of S101. Details are not described herein again.

S302. The terminal device transparently transmits, by using a DU of a radio access network device to which a current serving cell belongs, the report result to a CU of the radio access network device to which the current serving cell belongs.

Optionally, if the terminal device learns, by using a system information broadcast, that the current serving cell does not support a network slice service, the terminal device may choose to send only a report result of a part that is not related to the network slice service.

S303. The CU of the radio access network device to which the current serving cell belongs stores the report result sent by the terminal device, and sends the report result to a network management device or an AMF.

S304. The network management device or the AMF determines, based on the report result that is of at least one terminal device and that is received within a preset time period, a radio access network device that needs to adjust a network slice and a corresponding network slice identifier list.

S305. The network management device or the AMF sends an adjustment instruction to a CU of the radio access network device, where the adjustment instruction includes the updated network slice identifier list corresponding to the radio access network device.

Optionally, the adjustment instruction may further include adjustment for a signal of the radio access network device. The radio access network device herein may be the radio access network device to which the serving cell belongs, or may be another radio access network device.

S306. The CU of the radio access network device sends updated network slice configuration information to the terminal device.

After the radio access network device receives the adjustment instruction, the CU of the radio access network device adjusts a network slice service of the radio access network device. In this embodiment, S107' to S110' in the embodiment shown in FIG. 3 may be further included. A difference lies in that the steps in this embodiment are all performed by the CU of the radio access network device. Other operations are similar. For details, refer to S107' to S110'. Details are not described herein again.

In a conventional technology, for an RACH report, it is required that the CU of the radio access network device actively sends an RACH report request to the terminal device after the terminal device successfully performs random access, and the terminal device sends the RACH report to the radio access network device after receiving the request. However, in a CU-DU split architecture, if there is no RRC message exchange between the radio access network device and the terminal device in a random access process, the CU of the radio access network device is unaware of the entire random access process. Therefore, the CU cannot send the RACH report request to the terminal device in a timely manner after random access succeeds and obtain the RACH report. To resolve this problem, this application further provides a data transmission method. When the terminal device determines that a quantity of RACH reports already stored by the terminal device is greater than or equal to a preset quantity and/or time for which the RACH report has been stored by the terminal device is greater than or equal to preset duration, the terminal device sends the RACH report to the radio access network device to which the serving cell belongs, so that the radio access network device does not need to send the RACH report request, and the terminal device actively reports the RACH report. The following provides detailed descriptions with reference to FIG. 8.

Figure 8:
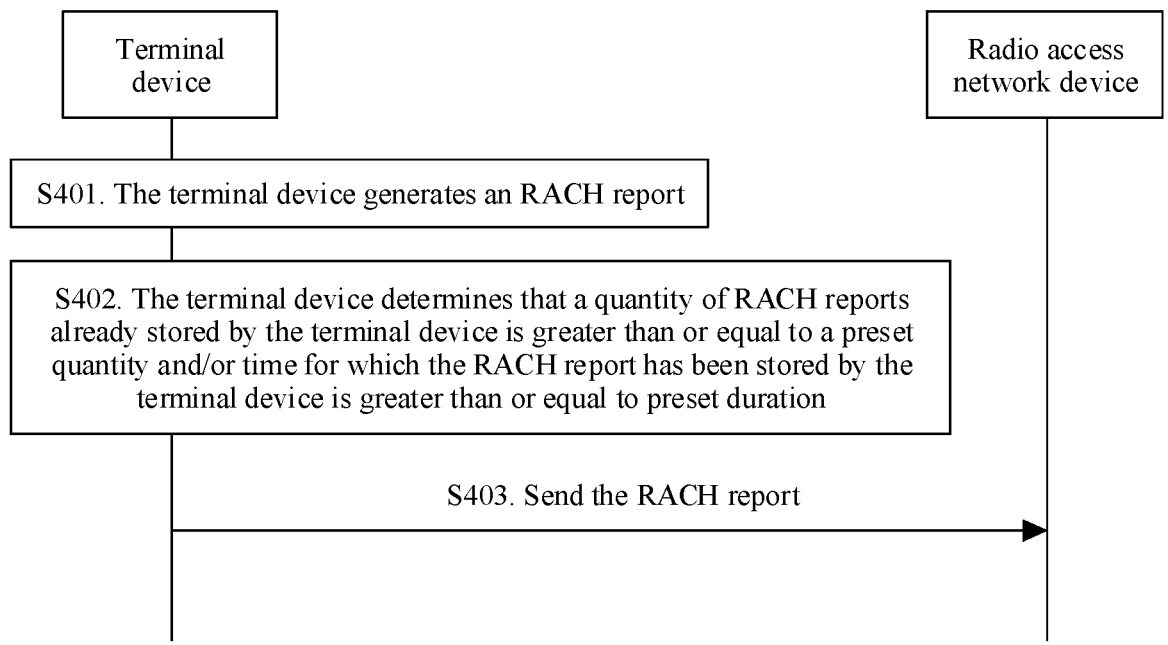
FIG. 8 is an interaction flowchart of an embodiment of a data transmission method according to this application.

FIG. 8 is an interaction flowchart of an embodiment of a data transmission method according to this application. As shown in FIG. 8, the method in this embodiment may include the following steps.

S401. A terminal device generates an RACH report.

For example, for a process in which the terminal device generates the RACH report, refer to descriptions of S1011 to S1014 in the embodiment shown in FIG. 2. Details are not described herein again. The terminal device stores the RACH report after a candidate access cell supports a network slice service initiated by the terminal device and the terminal device determines that random access to the candidate access cell succeeds. The RACH report includes an identifier of an already accessed cell and a network slice identifier corresponding to the network slice service initiated by the terminal device.

S402. The terminal device determines that a quantity of RACH reports already stored by the terminal device is greater than or equal to a preset quantity and/or time for which the RACH report has been stored by the terminal device is greater than or equal to preset duration.

The preset quantity is, for example, 8, and the preset duration is, for example, 48 hours. The quantity of already stored RACH reports may be obtained by using a counter set by the terminal device, and the time for which the RACH report has been stored may be obtained by using a timer set by the terminal device.

In an embodiment, the terminal device may trigger the timer when determining that a first trigger condition is satisfied, and record, by using the timer, the time for which the RACH report has been stored by the terminal device. Optionally, the first trigger condition includes that the first random access succeeds after the terminal device is powered on and/or the terminal device deletes the RACH report carried by the terminal device.

In an embodiment, the terminal device may trigger the counter when determining that a second trigger condition is satisfied, and record, by using the counter, the quantity of the random access reports already stored by the terminal device. The second trigger condition may be that the terminal device stores a random access report related to a preset network slice service.

Optionally, the timer and the counter that are set by the terminal device may be set for RACH reports related to one or more types of network slice services. For example, the counter is triggered only when the terminal device stores an RACH report related to a network slice service 1, or the timer is triggered only when the terminal device deletes or clears an RACH report related to the network slice service 1. The RACH report related to the network slice service 1 may be an RACH report generated based on random access initiated by the terminal device to upload data of the network slice service 1. The timer and the counter that are set by the terminal device may alternatively be set for all RACH reports. This is not limited in this embodiment.

S403. The terminal device sends the RACH result to a radio access network device to which a serving cell belongs.

Optionally, if the terminal device learns, by using a system information broadcast, that the serving cell does not support the network slice service, the terminal device may choose to report only an RACH report of a part that is not related to the network slice service. If the terminal device learns, by using the system information broadcast, that the current cell supports the network slice service, report result content reported by the terminal device may include information about the network slice service, or a part related to the information about the network slice service may be deleted.

For example, in an embodiment, S403 may be specifically: After the terminal device successfully performs random access to the serving cell, the radio access network device may send an RACH report request to the terminal device, and the terminal device sends the RACH report to the radio access network device based on the RACH report request.

In another embodiment, the terminal device may send, in an inactive mode, the RACH report to the radio access network device to which the serving cell belongs. S403 may be specifically: The terminal device sends small data to the radio access network device, where the small data carries the RACH report. In other words, the terminal device places the RACH report in the small data and sends the small data to the radio access network device.

Optionally, after S403, the method in this embodiment may further include the following steps.

S404. The terminal device deletes one or more already stored RACH reports in ascending order of importance.

A condition for determining importance may be as follows: Importance of an RACH report of a cell that supports the network slice service initiated by the terminal device is higher than importance of an RACH report of a cell that does not support the network slice service initiated by the terminal device; or importance of an RACH report of a cell having good signal quality (or high signal strength) is higher than importance of an RACH report of a cell having poor signal quality (or low signal strength). The terminal device may delete one or more reports, or clear an entire memory that stores the RACH report. The one or more already stored RACH reports are deleted in ascending order of importance, so that storage time of an RACH report of high importance can be prolonged, to fully utilize the RACH report.

According to the data transmission method provided in this embodiment, after a terminal device generates an RACH report, the terminal device determines that a quantity of RACH reports already stored by the terminal device is greater than or equal to a preset quantity and/or time for which the RACH report has been stored by the terminal device is greater than or equal to preset duration, the terminal device sends the RACH report to a radio access network device to which a serving cell belongs, so that the radio access network device does not need to send an RACH report request, and the terminal device actively reports the RACH report.

In a conventional technology, in a CU-DU split architecture, if there is no RRC message exchange between a radio access network device and a terminal device in a random access process, a CU of the radio access network device is unaware of the entire random access process, and the CU of the radio access network device does not know whether the terminal device successfully performs random access. To resolve this problem, this application further provides a data transmission method. After the terminal device successfully performs random access to a serving cell, the terminal device sends, to the radio access network device, indication information indicating that the terminal device successfully performs random access to the serving cell. Therefore, the radio access network device may learn, by using the indication information, that the terminal device successfully performs random access to the serving cell. The following provides detailed descriptions with reference to FIG. 9.

Figure 9:
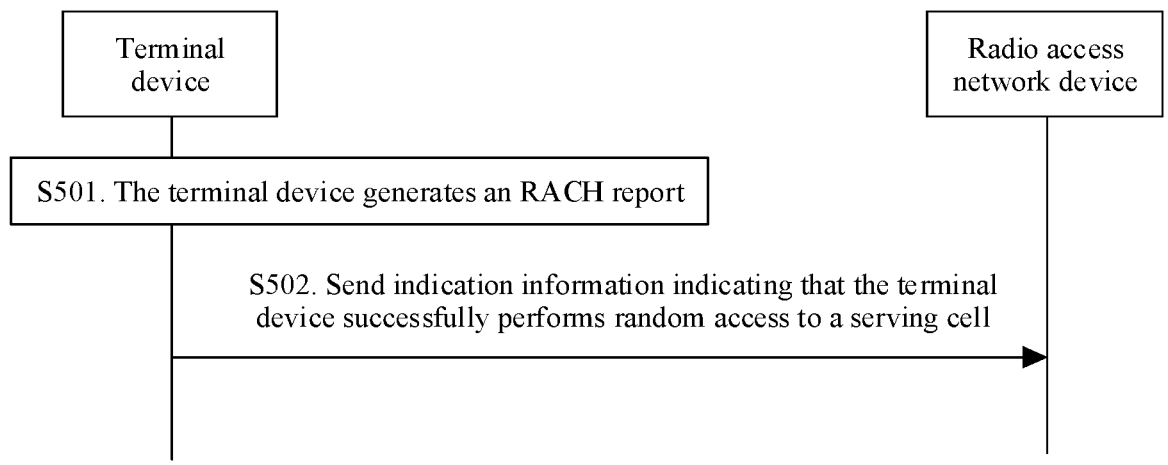
FIG. 9 is an interaction flowchart of an embodiment of a data transmission method according to this application.

FIG. 9 is an interaction flowchart of an embodiment of a data transmission method according to this application. As shown in FIG. 9, the method in this embodiment may include the following steps.

S501. A terminal device generates an RACH report.

S502. The terminal device sends, to a radio access network device to which a serving cell belongs, indication information indicating that the terminal device successfully performs random access to the serving cell.

For example, there may be a plurality of pieces of indication information. To be specific, the terminal device sends the indication information to the radio access network device once the terminal device successfully performs random access, so that the radio access network device can learn of a quantity of times of successful random access of the terminal device and a specific cell to which random access is successfully performed.

Optionally, the indication information may be carried in an RRC message.

In an embodiment, the terminal device may send the indication information after each time of successful random access.

In another embodiment, the terminal device may send the indication information after a part of random access success events. For example, the terminal device may select a preset random access event related to a network slice service, and send the indication information. Alternatively, if a message 3 or a message B does not carry the RRC message in four-step or two-step random access initiated by the terminal device, the terminal device sends the indication information. Alternatively, if a message 3 or a message B carries the RRC message in four-step or two-step random access initiated by the terminal device, the terminal device determines whether to send the indication information.

Optionally, the indication information may further include a network slice identifier of a type of network slice service or information indicating the network slice service. To be specific, it indicates that the radio access network device successfully performs random access to a type of network slice service, or it indicates that the radio access network device successfully performs random access to the network slice service.

Further, the method in this embodiment may further include the following steps.

S503. The radio access network device sends an RACH report request to the terminal device.

Optionally, the RACH report request may include at least one network slice identifier. To be specific, the radio access network device requests an RACH report corresponding to the at least one network slice identifier, and the radio access network device requests an RACH report related to a type of network slice service.

Optionally, the RACH report request may indicate to request an RACH report related to the network slice service. In other words, the radio access network device requests the RACH report related to the network slice service.

Optionally, the RACH report request may alternatively carry no information. To be specific, the radio access network device requests all RACH reports, regardless of whether the RACH report is related to the network slice service.

S504. The terminal device sends the RACH report to the radio access network device based on the RACH report request.

For example, the terminal device sends the RACH report to the radio access network device based on content of the RACH report request. If the RACH report request includes at least one network slice identifier, the terminal device sends an RACH report corresponding to the at least one network slice identifier to the radio access network device. If the RACH report request indicates to request the RACH report related to the network slice service, the terminal device sends the RACH report related to the network slice service to the radio access network device. If the RACH report request carries no information, the terminal device sends all already stored RACH reports to the radio access network device.

According to the data transmission method provided in this embodiment, after generating an RACH report, a terminal device sends, to a radio access network device to which a serving cell belongs, indication information indicating that the terminal device successfully performs random access to the serving cell, so that the radio access network device may learn, based on the indication information, that the terminal device successfully performs random access to the serving cell, and may further send an RACH report request to the terminal device to obtain the RACH report.

Figure 10:
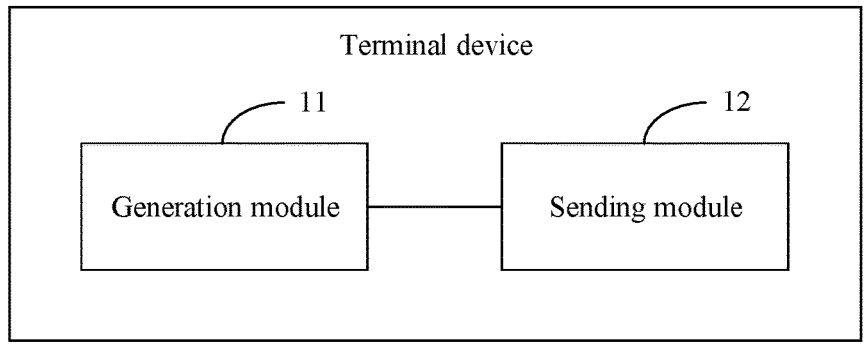
FIG. 10 is a schematic diagram of a structure of an embodiment of a terminal device according to this application.

FIG. 10 is a schematic diagram of a structure of an embodiment of a terminal device according to this application. As shown in FIG. 10, the terminal device in this embodiment may include: a generation module 11 and a sending module 12.

The generation module 11 is configured to generate a report result, where the report result includes at least one of a logged minimization of drive tests report, a radio link failure RLF report, and a random access channel RACH report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device.

The sending module 12 is configured to send the report result to a radio access network device to which a serving cell belongs.

The terminal device in this embodiment may be configured to execute the technical solution of the method embodiment shown in FIG. 2, FIG. 4, or FIG. 8. Implementation principles and technical effects thereof are similar. Details are not described herein again.

Figure 11:
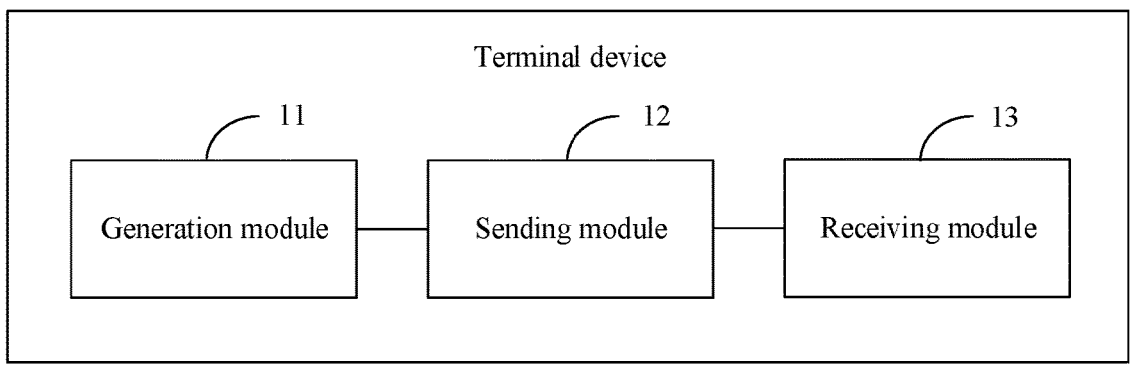
FIG. 11 is a schematic diagram of a structure of an embodiment of a terminal device according to this application.

FIG. 11 is a schematic diagram of a structure of an embodiment of a terminal device according to this application. As shown in FIG. 11, based on FIG. 10, the terminal device in this embodiment may further include a receiving module 13. The receiving module 13 is configured to receive updated network slice configuration information sent by the radio access network device. The updated network slice configuration information is determined by the radio access network device, a network management device, or an access and mobility management function AMF network element based on the report result of at least one terminal device within a preset time period.

The updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

Further, the generation module 11 is configured to:
perform the following operations based on reference signal information of the already measured candidate access cell:
obtaining a network slice identifier list of a first candidate access cell;
determining, based on the network slice identifier list of the first candidate access cell, whether the first candidate access cell supports the network slice service initiated by the terminal device; and
if yes is determined,
after determining that random access to the first candidate access cell succeeds, storing an RACH report corresponding to the first candidate access cell; or
after determining that random access to the first candidate access cell succeeds and the radio link failure occurs in a subsequent communication process, storing an RLF report corresponding to the first candidate access cell; or
after determining that random access to the first candidate access cell fails, obtaining a network slice identifier list of a second candidate access cell, and storing a logged minimization of drive tests report corresponding to the first candidate access cell; or
if no is determined, storing the logged minimization of drive tests report corresponding to the first candidate access cell, or obtaining the network slice identifier list of the second candidate access cell, and storing the logged minimization of drive tests report corresponding to the first candidate access cell.

The terminal device in this embodiment may be configured to execute the technical solution of the method embodiment shown in FIG. 2, FIG. 4, or FIG. 8. Implementation principles and technical effects thereof are similar. Details are not described herein again.

Figure 12:
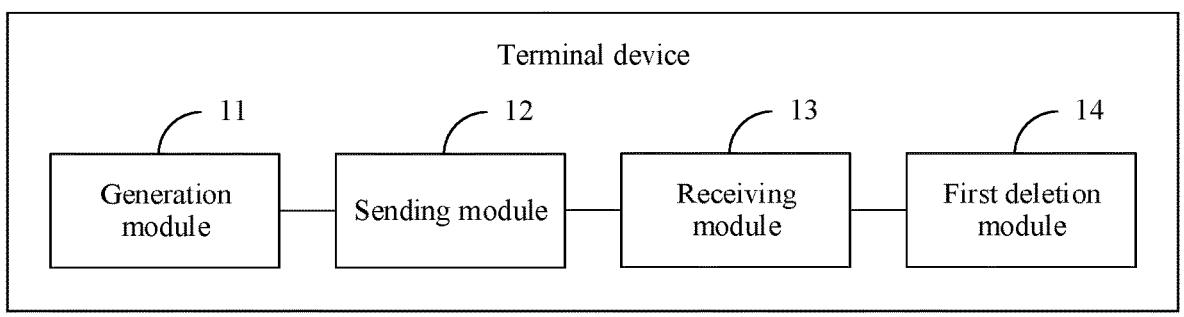
FIG. 12 is a schematic diagram of a structure of an embodiment of a terminal device according to this application.

FIG. 12 is a schematic diagram of a structure of an embodiment of a terminal device according to this application. As shown in FIG. 12, based on FIG. 11, the terminal device in this embodiment may further include a first deletion module 14. The first deletion module 14 is configured to: when determining that one or more already stored RACH reports satisfy a preset condition, delete the one or more already stored RACH reports in ascending order of importance.

Optionally, that the generation module 11 determines that random access to the first candidate access cell fails includes:
determining that a quantity of times of random access to the first candidate access cell is greater than a first threshold; or
determining that random access to the first candidate access cell succeeds and that a quantity of random access attempts initiated again after the radio link failure occurs in the subsequent communication process is greater than a first threshold.

Optionally, the logged minimization of drive tests report further includes at least one of network slice remapping information of the candidate access cell and network slice redirection of the candidate access cell.

Optionally, the logged minimization of drive tests report further includes information indicating signal strength and signal quality of the candidate access cell.

Optionally, the receiving module 13 is further configured to:
receive adjustment information of an access category sent by the radio access network device, where the adjustment information of the access category is used to add the access category related to the network slice service.

The terminal device in this embodiment may be configured to execute the technical solution of the method embodiment shown in FIG. 2, FIG. 4, or FIG. 8. Implementation principles and technical effects thereof are similar. Details are not described herein again.

Figure 13:
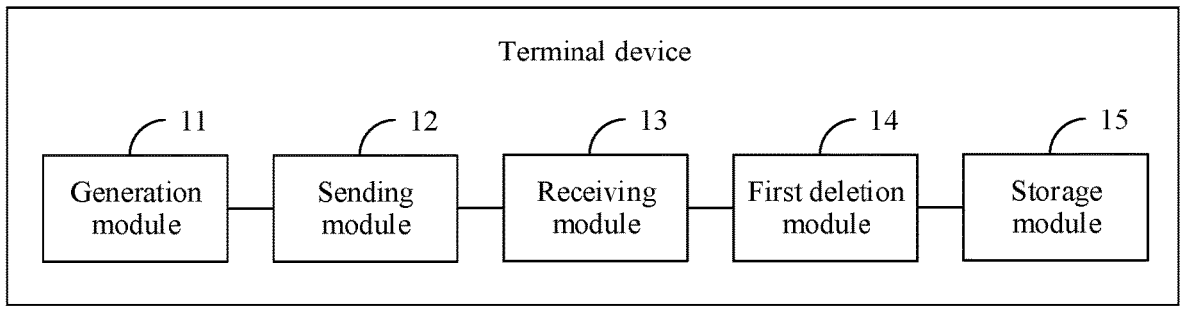
FIG. 13 is a schematic diagram of a structure of an embodiment of a terminal device according to this application.

FIG. 13 is a schematic diagram of a structure of an embodiment of a terminal device according to this application. As shown in FIG. 13, based on FIG. 11 or FIG. 12, the terminal device in this embodiment may further include a storage module 15. The storage module 15 is configured to prestore the adjustment information of the access category.

The terminal device in this embodiment may be configured to execute the technical solution of the method embodiment shown in FIG. 2, FIG. 4, or FIG. 8. Implementation principles and technical effects thereof are similar. Details are not described herein again.

Figure 14:
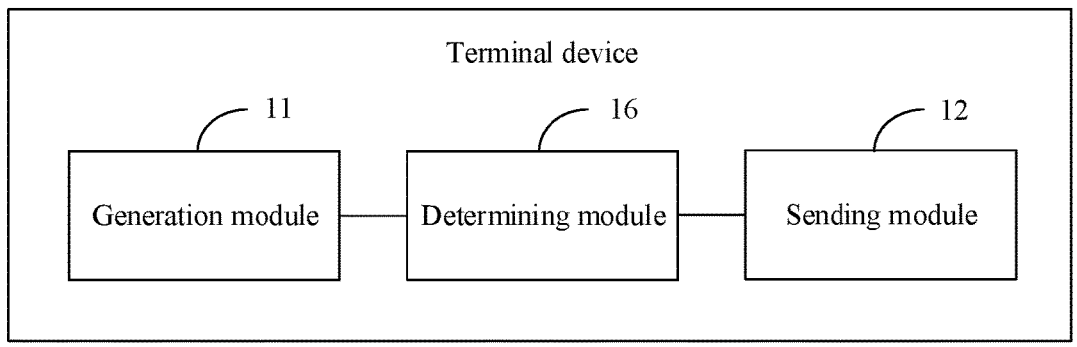
FIG. 14 is a schematic diagram of a structure of an embodiment of a terminal device according to this application.

FIG. 14 is a schematic diagram of a structure of an embodiment of a terminal device according to this application. As shown in FIG. 14, based on FIG. 10, the terminal device in this embodiment may further include a determining module 16. The determining module 16 is configured to, before the sending module 12 sends the report result to the radio access network device to which the serving cell belongs, determine that a quantity of RACH reports already stored by the terminal device is greater than or equal to a preset quantity and/or time for which the RACH report has been stored by the terminal device is greater than or equal to preset duration.

Figure 15:
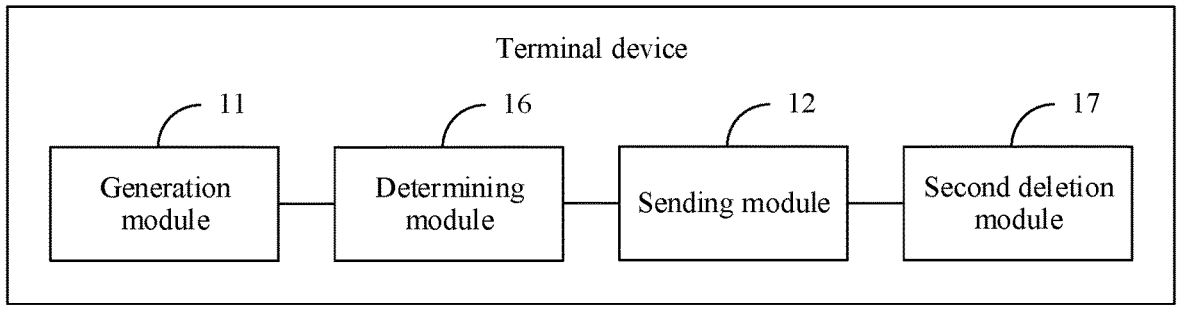
FIG. 15 is a schematic diagram of a structure of an embodiment of a terminal device according to this application.

FIG. 15 is a schematic diagram of a structure of an embodiment of a terminal device according to this application. As shown in FIG. 15, based on FIG. 14, the terminal device in this embodiment may further include a second deletion module 17. The second deletion module 17 is configured to: after the sending module 12 sends the report result to the radio access network device to which the serving cell belongs, delete the one or more already stored RACH reports in ascending order of importance.

The terminal device in the embodiments shown in FIG. 14 and FIG. 15 may be configured to execute the technical solution of the method embodiment shown in FIG. 2, FIG. 4, or FIG. 8. Implementation principles and technical effects thereof are similar. Details are not described herein again.

Figure 16:
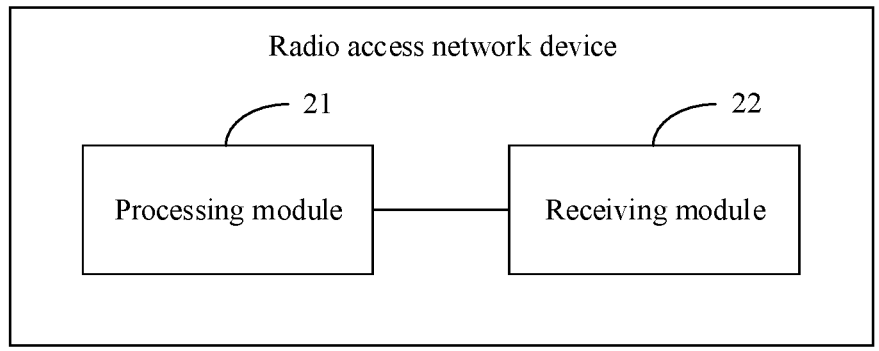
FIG. 16 is a schematic diagram of a structure of an embodiment of a radio access network device according to this application.

FIG. 16 is a schematic diagram of a structure of an embodiment of a radio access network device according to this application. As shown in FIG. 16, the radio access network device in this embodiment may include a processing module 21 and a receiving module 22.

The processing module 21 is configured to establish a connection to a terminal device; and the receiving module 22 is configured to receive a report result sent by the terminal device. The report result includes at least one of a logged minimization of drive tests report, a radio link failure RLF report, and a random access channel RACH report. The logged minimization of drive tests report includes an identifier of a candidate access cell, information indicating whether the candidate access cell supports a network slice service initiated by the terminal device, location information of the terminal device when the terminal device receives a system message of the candidate access cell, and a network slice identifier corresponding to the network slice service initiated by the terminal device, where the candidate access cell is first N cells sorted in descending order of signal strength or signal quality in one or more cells measured by the terminal device, and N is a preset positive integer. The RLF report includes an identifier of a cell in which a radio link failure occurs after the terminal device accesses the cell and the network slice identifier corresponding to the network slice service in which the radio link failure occurs on the terminal device. The RACH report includes an identifier of a cell accessed by the terminal device and the network slice identifier corresponding to the network slice service initiated by the terminal device.

The radio access network device in this embodiment may be configured to execute the technical solution of the method embodiment shown in FIG. 2 or FIG. 4. Implementation principles and technical effects thereof are similar. Details are not described herein again.

Figure 17:
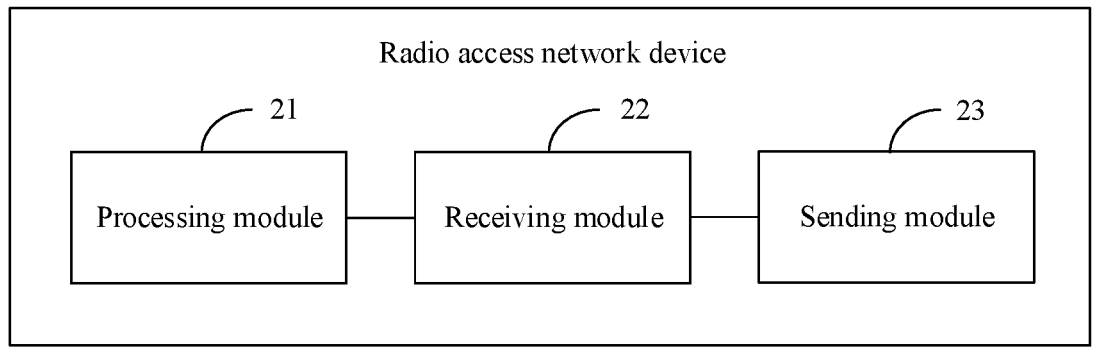
FIG. 17 is a schematic diagram of a structure of an embodiment of a radio access network device according to this application.

FIG. 17 is a schematic diagram of a structure of an embodiment of a radio access network device according to this application. As shown in FIG. 17, based on FIG. 16, the radio access network device in this embodiment may further include a sending module 23. The sending module 23 is configured to send updated network slice configuration information to the terminal device. The updated network slice configuration information is determined by the radio access network device, a network management device, or an access and mobility management function AMF network element based on the report result of at least one terminal device within a preset time period.

The updated network slice configuration information includes a network slice identifier list, the network slice identifier list includes a network slice identifier corresponding to at least one network slice that can be supported by the radio access network device, and the network slice identifier list includes the network slice identifier corresponding to the network slice service initiated by the terminal device in a cell controlled by the radio access network device.

Further, the processing module 21 is further configured to store the report result.

The sending module 23 is further configured to send the report result to another radio access network device.

Further, the processing module 21 is further configured to determine the network slice identifier list based on the logged minimization of drive tests report, the RLF report, and the RACH report in the report result that is of the at least one terminal device and that is received within the preset time period.

Further, the processing module 21 is further configured to store the report result.

The sending module 23 is further configured to send the report result to the network management device or the access and mobility management function (AMF) network element, so that the network management device or the AMF determines, based on the logged minimization of drive tests report, the RLF report, and the RACH report in the report result that is of the at least one terminal device and that is received within the preset time period, a radio access network device that needs to adjust a network slice and a corresponding network slice identifier list.

Further, the receiving module 22 is further configured to:

before the sending module 23 sends the updated network slice configuration information to the terminal device, receive an adjustment instruction sent by the network management device or the AMF, where the adjustment instruction includes the updated network slice identifier list corresponding to the radio access network device.

Further, the processing module 21 is further configured to:

determine updated network slice remapping information based on the report result and the updated network slice configuration information; and the sending module 23 is further configured to send the updated network slice remapping information to the terminal device.

Further, the updated network slice configuration information further includes adjustment information of access control information of the network slice service.

Optionally, the adjustment information of the access control information of the network slice service is a system message.

An access control identifier ID related to the network slice service is deleted from unified access control-barring for access identity information in the system message;

an access control ID unrelated to the network slice service is added to unified access control-barring for access identity information in the system message;

a value of a unified access control-barring for factor information element that is in the system message and that corresponds to the network slice service decreases within a preset range; or a value of a unified access control time information element that is in the system message and that corresponds to the network slice service increases within a preset range.

Further, the sending module 23 is further configured to:

send adjustment information of an access category to the terminal device, where the adjustment information of the access category is used to add the access category related to the network slice service; or the processing module is further configured to prestore adjustment information of an access category.

Further, the processing module 21 is further configured to:
adjust, based on the report result that is of a plurality of terminal devices and that is received within a preset time period, a transmit signal power of at least one network slice supported by the radio access network device; and/or
adjust, based on the report result that is of the plurality of terminal devices and that is received within the preset time period, an RACH resource of the at least one network slice supported by the radio access network device.

The radio access network device in this embodiment may be configured to execute the technical solution of the method embodiment shown in FIG. 2 or FIG. 4. Implementation principles and technical effects thereof are similar. Details are not described herein again.

Figure 18:
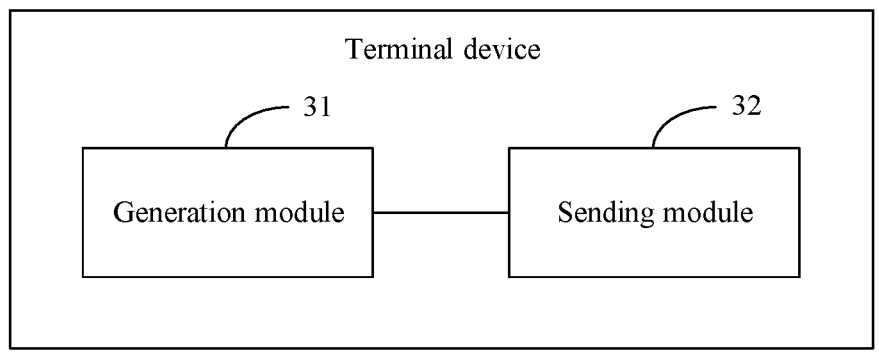
FIG. 18 is a schematic diagram of a structure of an embodiment of a terminal device according to this application.

FIG. 18 is a schematic diagram of a structure of an embodiment of a terminal device according to this application. As shown in FIG. 18, the terminal device in this embodiment may include: a generation module 31 and a sending module 32.

The generation module 31 is configured to generate an RACH report.

The sending module 32 is configured to send a radio access network device to which a serving cell belongs, indication information indicating that the terminal device successfully performs random access to the serving cell.

Optionally, the sending module 32 is further configured to send the RACH report to the radio access network device based on an RACH report request.

The terminal device in this embodiment may be used to perform the technical solution of the method embodiment shown in FIG. 9. Implementation principles and technical effects thereof are similar, and are not described herein again.

Figure 19:
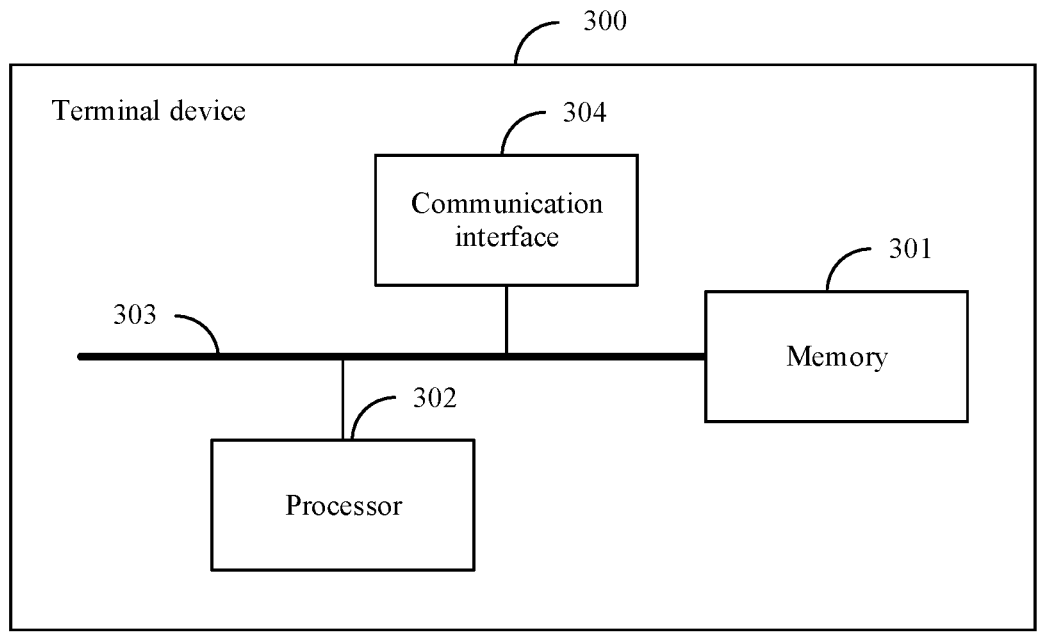
FIG. 19 is a schematic diagram of a structure of a terminal device according to this application.

FIG. 19 is a schematic diagram of a structure of a terminal device according to this application. As shown in FIG. 19, the terminal device 300 includes a memory 301 and a processor 302.

The memory 301 is configured to store a computer program.

The processor 302 is configured to execute the computer program stored in the memory, to implement the data transmission method in the foregoing embodiments. For details, refer to related descriptions in the foregoing method embodiments.

Optionally, the memory 301 may be independent, or may be integrated with the processor 302.

When the memory 301 is a component independent of the processor 302, the terminal device 300 may further include:
a bus 303, configured to connect the memory 301 and the processor 302.

Optionally, this embodiment further includes a communication interface 304. The communication interface 304 may be connected to the processor 302 through the bus 303. The processor 302 may control the communication interface 303 to implement the foregoing sending and receiving functions of the terminal device 300.

The apparatus may be configured to perform steps and/or procedures corresponding to the terminal device in the foregoing method embodiments.

Figure 20:
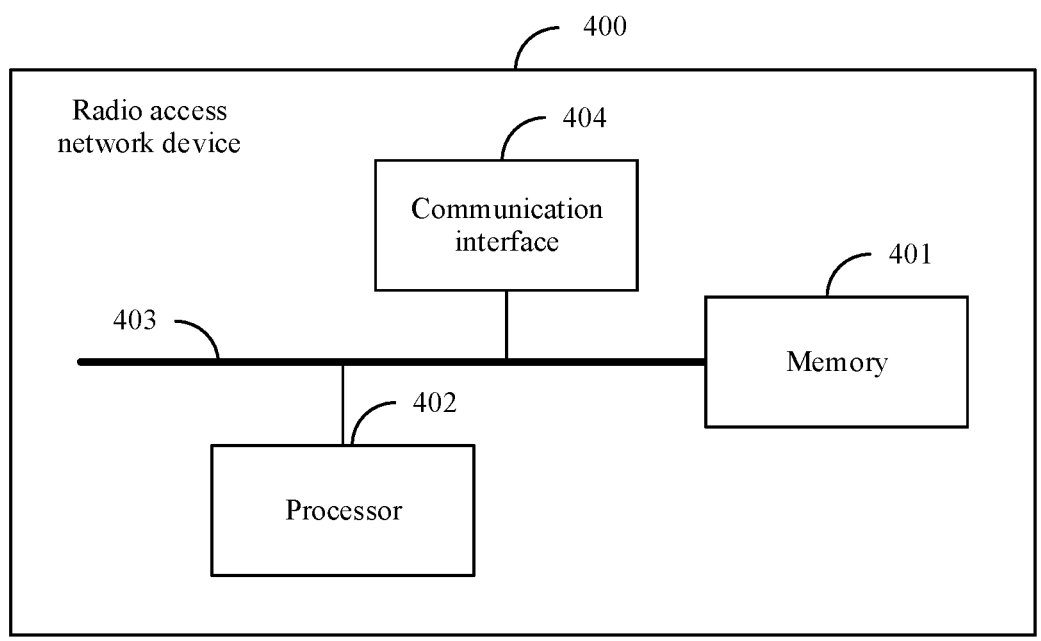
FIG. 20 is a schematic diagram of a structure of a radio access network device according to this application.

FIG. 20 is a schematic diagram of a structure of a radio access network device according to this application. As shown in FIG. 20, the radio access network device 400 includes a memory 401 and a processor 402.

The memory 401 is configured to store a computer program.

The processor 402 is configured to execute the computer program stored in the memory, to implement the data transmission method in the foregoing embodiments. For details, refer to related descriptions in the foregoing method embodiments.

Optionally, the memory 401 may be independent, or may be integrated with the processor 402.

When the memory 401 is a component independent of the processor 402, the radio access network device 400 may further include:
a bus 403, configured to connect the memory 401 and the processor 402.

Optionally, this embodiment further includes a communication interface 404. The communication interface 404 may be connected to the processor 402 through the bus 403. The processor 402 may control the communication interface 403 to implement the foregoing sending and receiving functions of the radio access network device 400.

The apparatus may be configured to perform steps and/or procedures corresponding to the radio access network device in the foregoing method embodiments.

This application further provides a readable storage medium. The readable storage medium stores execution instructions. When at least one processor of a terminal device executes the execution instructions, the terminal device performs the data transmission method provided in the foregoing implementations.

This application further provides a readable storage medium. The readable storage medium stores execution instructions. When at least one processor of a radio access network device executes the execution instructions, the radio access network device performs the data transmission method provided in the foregoing implementations.

This application further provides a program product. The program product includes execution instructions, and the execution instructions are stored in a readable storage medium. At least one processor of a terminal device may read the execution instructions from the readable storage medium, and the at least one processor executes the execution instructions, so that the terminal device implements the data transmission method provided in the foregoing implementations.

This application further provides a program product. The program product includes execution instructions, and the execution instructions are stored in a readable storage medium. At least one processor of a radio access network device may read the execution instructions from the readable storage medium, and the at least one processor executes the execution instructions, so that the radio access network device implements the data transmission method provided in the foregoing implementations.

A person of ordinary skill in the art may understand that all or a part of the foregoing embodiments may be implemented by using software, hardware, firmware, or any combination thereof. When the software is used to implement embodiments, all or a part of functions may be implemented in a form of a computer program product. The computer program product includes one or more computer instructions. When the computer program instructions are loaded and executed on a computer, procedures or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

What is claimed is:

1. A data transmission method, comprising:

generating, by a terminal device, a report result, wherein the report result comprises at least one of a logged minimization of drive tests report, a radio link failure (RLF) report, and a random access channel (RACH) report, wherein the logged minimization of drive tests report comprises an identifier of a candidate access cell, information indicating whether the candidate access cell supports a network slice service initiated by the terminal device, location information of the terminal device where the terminal device receives a system message of the candidate access cell, and a network slice identifier corresponding to the network slice service initiated by the terminal device, wherein the candidate access cell is one of first N cells sorted in descending order of signal strength or signal quality in one or more cells measured by the terminal device, and N is a preset positive integer, the RLF report comprises an identifier of a cell in which a radio link failure occurs after the terminal device accesses the cell and the network slice identifier corresponding to the network slice service in which the radio link failure occurs on the terminal device, and the RACH report comprises an identifier of a cell accessed by the terminal device and the network slice identifier corresponding to the network slice service initiated by the terminal device;

sending, by the terminal device, the report result to a radio access network device to which a serving cell belongs; and receiving, by the terminal device, updated network slice configuration information sent by the radio access network device, wherein the updated network slice configuration information is determined by the radio access network device, a network management device, or an access and mobility management function (AMF) network element based on the report result of at least one terminal device within a preset time period, wherein the updated network slice configuration information comprises a network slice identifier list, the network slice identifier list comprises a network slice identifier corresponding to at least one network slice that can be supported by the radio access network device, and the network slice identifier list comprises the network slice identifier corresponding to the network slice service initiated by the terminal device in a cell controlled by the radio access network device; and wherein the generating, by a terminal device, a report result comprises:

performing, by the terminal device, the following operations based on reference signal information of the candidate access cell:

obtaining, by the terminal device, a network slice identifier list of a first candidate access cell;

determining, by the terminal device based on the network slice identifier list of the first candidate access cell, whether the first candidate access cell supports the network slice service initiated by the terminal device; and based on a determination that the first candidate access cell supports the network slice service initiated by the terminal device:

after determining that random access to the first candidate access cell succeeds, storing, by the terminal device, a RACH report corresponding to the first candidate access cell; or after determining that random access to the first candidate access cell succeeds and the radio link failure occurs in a subsequent communication process, storing, by the terminal device, a RLF report corresponding to the first candidate access cell; or after determining that random access to the first candidate access cell fails, obtaining, by the terminal device, a network slice identifier list of a second candidate access cell, and storing a logged minimization of drive tests report corresponding to the first candidate access cell.

2. The method according to claim 1, wherein the method further comprises:

based on the terminal device determining that one or more already stored RACH reports satisfy a preset condition, deleting, by the terminal device, the one or more already stored RACH reports in ascending order of importance.

3. The method according to claim 1, wherein the determining, by the terminal device, that random access to the first candidate access cell fails comprises:

determining, by the terminal device, that a quantity of random access attempts initiated in the first candidate access cell is greater than a first threshold; or determining, by the terminal device, that random access to the first candidate access cell succeeds and that a quantity of random access attempts initiated again after the radio link failure occurs in the subsequent communication process is greater than a first threshold.

4. The method according to claim 1, wherein the logged minimization of drive tests report further comprises at least one of network slice remapping information of the candidate access cell and network slice redirection of the candidate access cell.

5. The method according to claim 1, wherein the method further comprises:

receiving, by the terminal device, adjustment information of an access category sent by the radio access network device, wherein the adjustment information of the access category is used to add the access category related to the network slice service to an access category list; or prestoring, by the terminal device, adjustment information of an access category.

6. The method according to claim 1, wherein based on the report result comprising the RACH report, before the sending, by the terminal device, the report result to a radio access network device to which a serving cell belongs, the method further comprises:

determining, by the terminal device, that a quantity of RACH reports already stored by the terminal device is greater than or equal to a preset quantity and/or time for which the RACH report has been stored by the terminal device is greater than or equal to preset duration.

7. The method according to claim 6, wherein after the sending, by the terminal device, the report result to a radio access network device to which a serving cell belongs, the method further comprises:
deleting, by the terminal device, the one or more already stored RACH reports in ascending order of importance.

8. A data transmission method, comprising:
establishing, by a radio access network device, a connection to a terminal device;
receiving, by the radio access network device, a report result sent by the terminal device, wherein the report result comprises at least one of a logged minimization of drive tests report, a radio link failure (RLF) report, and a random access channel (RACH) report, wherein the logged minimization of drive tests report comprises an identifier of a candidate access cell, information indicating whether the candidate access cell supports a network slice service initiated by the terminal device, location information of the terminal device where the terminal device receives a system message of the candidate access cell, and a network slice identifier corresponding to the network slice service initiated by the terminal device, wherein the candidate access cell is one of first N cells sorted in descending order of signal strength or signal quality in one or more cells measured by the terminal device, and N is a preset positive integer, the RLF report comprises an identifier of a cell in which a radio link failure occurs after the terminal device accesses the cell and the network slice identifier corresponding to the network slice service in which the radio link failure occurs on the terminal device, and the RACH report comprises an identifier of a cell accessed by the terminal device and the network slice identifier corresponding to the network slice service initiated by the terminal device; and
sending, by the radio access network device, updated network slice configuration information to the terminal device, wherein the updated network slice configuration information is determined by the radio access network device, a network management device, or an access and mobility management function (AMF) network element based on the report result of at least one terminal device within a preset time period, wherein
the updated network slice configuration information comprises a network slice identifier list, the network slice identifier list comprises a network slice identifier corresponding to at least one network slice that can be supported by the radio access network device, and the network slice identifier list comprises the network slice identifier corresponding to the network slice service initiated by the terminal device in a cell controlled by the radio access network device;
wherein the updated network slice configuration information further comprises adjustment information of access control information of the network slice service;
wherein the adjustment information of the access control information of the network slice service is a system message, and wherein:
an access control identifier (ID) related to the network slice service is deleted from unified access control-barring for access identity information in the system message;
a value of a unified access control-barring for factor information element that is in the system message and that corresponds to the network slice service decreases within a preset range; or
a value of a unified access control time information element that is in the system message and that corresponds to the network slice service increases within a preset range.

9. The method according to claim 8, wherein the method further comprises:
storing, by the radio access network device, the report result, and sending the report result to another radio access network device.

10. The method according to claim 9, wherein the method further comprises:
determining, by the radio access network device, the network slice identifier list based on a logged minimization of drive tests report, a RLF report, and a RACH report in the report result.

11. The method according to claim 8, wherein the method further comprises:
storing, by the radio access network device, the report result, and sending the report result to the network management device or the AMF network element, to enable the network management device or the AMF to determine, based on the report result, a radio access network device that needs to adjust a network slice and a corresponding network slice identifier list.

12. The method according to claim 11, wherein before the sending, by the radio access network device, updated network slice configuration information to the terminal device, the method further comprises:
receiving, by the radio access network device, an adjustment instruction sent by the network management device or the AMF, wherein the adjustment instruction comprises the updated network slice identifier list corresponding to the radio access network device.

13. The method according to claim 8, wherein the method further comprises:
determining, by the radio access network device, updated network slice remapping information based on the report result and the updated network slice configuration information; and
sending, by the radio access network device, the updated network slice remapping information to the terminal device.

14. The method according to claim 8, wherein the method further comprises:
sending, by the radio access network device, adjustment information of an access category to the terminal device, wherein the adjustment information of the access category is used to add the access category related to the network slice service to an access category list; or
prestoring, by the radio access network device, adjustment information of an access category.

15. A terminal device, comprising:
a processor, configured to generate a report result, wherein the report result comprises at least one of a logged minimization of drive tests report, a radio link failure (RLF) report, and a random access channel (RACH) report, wherein the logged minimization of drive tests report comprises an identifier of a candidate access cell, information indicating whether the candidate access cell supports a network slice service initiated by the terminal device, location information of the terminal device where the terminal device receives a system message of the candidate access cell, and a network slice identifier corresponding to the network slice service initiated by the terminal device, wherein the candidate access cell is one of first N cells sorted in descending order of signal strength or signal quality in one or more cells measured by the terminal device, and N is a preset positive integer, the RLF report comprises an identifier of a cell in which a radio link failure occurs after the terminal device accesses the cell and the network slice identifier corresponding to the network slice service in which the radio link failure occurs on the terminal device, and the RACH report comprises an identifier of a cell accessed by the terminal device and the network slice identifier corresponding to the network slice service initiated by the terminal device; and a communication interface, configured to send the report result to a radio access network device to which a serving cell belongs and receive updated network slice configuration information sent by the radio access network device, wherein the updated network slice configuration information is determined by the radio access network device, a network management device, or an access and mobility management function (AMF) network element based on the report result of at least one terminal device within a preset time period, wherein the updated network slice configuration information comprises a network slice identifier list, the network slice identifier list comprises a network slice identifier corresponding to at least one network slice that can be supported by the radio access network device, and the network slice identifier list comprises the network slice identifier corresponding to the network slice service initiated by the terminal device in a cell controlled by the radio access network device; and wherein that the processor generates a report result comprises the processor performing the following operations based on reference signal information of the already measured candidate access cell:

obtaining a network slice identifier list of a first candidate access cell;

determining, based on the network slice identifier list of the first candidate access cell, whether the first candidate access cell supports the network slice service initiated by the terminal device; and based on a determination that the first candidate access cell supports the network slice service initiated by the terminal device, after determining that random access to the first candidate access cell succeeds, storing, a RACH report corresponding to the first candidate access cell; or after determining that random access to the first candidate access cell succeeds and the radio link failure occurs in a subsequent communication process, storing a RLF report corresponding to the first candidate access cell; or after determining that random access to the first candidate access cell fails, obtaining a network slice identifier list of a second candidate access cell, and storing a logged minimization of drive tests report corresponding to the first candidate access cell.

\* \* \* \* \*